(12) United States Patent
Akinyemi et al.

(10) Patent No.: US 10,030,617 B2
(45) Date of Patent: *Jul. 24, 2018

(54) SYSTEMS AND METHODS FOR ENGINE CONTROL

(71) Applicant: General Electric Company, Schenectady, NY (US)

(72) Inventors: Omowoleola Chukuwuemeka Akinyemi, Niskayuna, NY (US); Adam Klingbeil, Ballston Lake, NY (US); Neil Xavier Blythe, Lawrence Park, PA (US); Shawn Michael Gallagher, Lawrence Park, PA (US); James Robert Mischler, Lawrence Park, PA (US); Luke Henry, Lawrence Park, PA (US); Jennifer Lynn Jackson, Cohoes, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,013

(22) Filed: Apr. 18, 2016

(65) Prior Publication Data

US 2016/0230712 A1    Aug. 11, 2016

Related U.S. Application Data

(63) Continuation-in-part of application No. 13/113,138, filed on May 23, 2011, now Pat. No. 9,316,165, and
(Continued)

(51) Int. Cl.
*F02B 1/00* (2006.01)
*F02M 26/43* (2016.01)
(Continued)

(52) U.S. Cl.
CPC .......... *F02M 26/43* (2016.02); *F01N 13/107* (2013.01); *F02D 21/08* (2013.01); *F02D 41/005* (2013.01);
(Continued)

(58) Field of Classification Search
CPC ............. F02D 41/0087; F02D 41/0065; F02D 41/0077; F02D 41/005; F02D 41/1497;
(Continued)

(56) References Cited

U.S. PATENT DOCUMENTS 4,143,635 A   3/1979   Iizuka et al.
4,179,892 A   12/1979  Heydrich
(Continued)

FOREIGN PATENT DOCUMENTS

CA   2798599 A1   2/2013
CN   1536215 A    10/2004
(Continued)

OTHER PUBLICATIONS

Faiz, A. et al., "Air Pollution from Motor Vehicles: Standards and Technologies for Controlling Emissions," The World Bank, Washington, D.C., Nov. 1996, 266 pages.
(Continued)

*Primary Examiner* — Hai Huynh
*Assistant Examiner* — Gonzalo Laguarda
(74) *Attorney, Agent, or Firm* — GE Global Patent Operation; John A. Kramer

(57) ABSTRACT

Various methods for controlling EGR rate are disclosed. In one embodiment, a method comprises routing at least a portion of exhaust from a first exhaust manifold to an intake manifold, and not to atmosphere, the first exhaust manifold exclusively coupled to a first cylinder group. The method further includes routing exhaust from at least one additional exhaust manifold coupled to a corresponding at least one
(Continued)

additional cylinder group to atmosphere, and during a first engine operating condition where an engine fuel demand is below a threshold demand, not injecting fuel to each of a subset of cylinders in the first cylinder group while injecting fuel to a subset of all cylinders coupled to the at least one additional exhaust manifold, where a number of cylinders of the subset of cylinders in the first cylinder group decreases in response to an increase in a target EGR rate.

20 Claims, 11 Drawing Sheets

Related U.S. Application Data a continuation-in-part of application No. 14/632,028, filed on Feb. 26, 2015, now Pat. No. 9,422,879, which is a continuation of application No. 13/562,356, filed on Jul. 31, 2012, now Pat. No. 8,985,088, application No. 15/132,013, which is a continuation-in-part of application No. 14/450,493, filed on Aug. 4, 2014, now Pat. No. 9,631,569.

(51) Int. Cl.
| | |
|---|---|
| F02D 41/00 | (2006.01) |
| F01N 13/10 | (2010.01) |
| F02D 21/08 | (2006.01) |
| F02M 26/14 | (2016.01) |
| F02M 26/17 | (2016.01) |
| F02D 41/08 | (2006.01) |
| F02M 26/05 | (2016.01) |

(52) U.S. Cl.
CPC ..... *F02D 41/0065* (2013.01); *F02D 41/0087* (2013.01); *F02D 41/08* (2013.01); *F02M 26/05* (2016.02); *F02M 26/14* (2016.02); *F02M 26/17* (2016.02); *Y02T 10/47* (2013.01)

(58) Field of Classification Search
CPC .......... F02D 41/08; F02D 21/08; F02D 17/02; F02D 13/06; F02M 26/43; F02M 26/05; F02M 26/14; F02M 26/17; F01N 13/107; Y02T 10/47
USPC .......................... 123/198 F, 481, 568.21, 436
See application file for complete search history.

(56) References Cited

U.S. PATENT DOCUMENTS

| | | | |
|---|---|---|---|
| 4,231,338 | A | 11/1980 | Sugasawa et al. |
| 4,462,351 | A | 7/1984 | Fujii et al. |
| 4,955,326 | A | 9/1990 | Helmich |
| 5,377,631 | A | 1/1995 | Schechter |
| 5,477,830 | A | 12/1995 | Beck et al. |
| 5,517,976 | A | 5/1996 | Bachle et al. |
| 5,553,575 | A | 9/1996 | Beck et al. |
| 5,561,602 | A | 10/1996 | Bessler et al. |
| 5,826,563 | A | 10/1998 | Patel et al. |
| 6,006,732 | A | 12/1999 | Oleksiewicz |
| 6,138,650 | A | 10/2000 | Bailey |
| 6,286,489 | B1 | 9/2001 | Bailey |
| 6,360,724 | B1 | 3/2002 | Suhre et al. |
| 6,405,705 | B1 | 6/2002 | Dunsworth et al. |
| 6,408,625 | B1 | 6/2002 | Woon et al. |
| 6,543,230 | B1 | 4/2003 | Schmid |
| 6,789,531 | B1 | 9/2004 | Remmels |
| 6,823,835 | B2 | 11/2004 | Dunsworth et al. |
| 6,871,642 | B1 | 3/2005 | Osterwald |
| 6,877,492 | B1 | 4/2005 | Osterwald |
| 6,948,475 | B1 | 9/2005 | Wong et al. |
| 6,953,030 | B2 | 10/2005 | Linderyd et al. |
| 7,270,089 | B2 | 9/2007 | Wong |
| 7,444,815 | B2 | 11/2008 | Baumgard et al. |
| 7,487,766 | B2 | 2/2009 | Alger et al. |
| 7,640,094 | B2 | 12/2009 | Ishikawa et al. |
| 7,801,664 | B2 | 9/2010 | Winstead |
| 7,849,835 | B2 | 12/2010 | Tripathi et al. |
| 7,941,999 | B2 | 5/2011 | Kasper et al. |
| 8,113,186 | B2 | 2/2012 | Tsunooka et al. |
| 8,205,583 | B2 | 6/2012 | Winstead |
| 8,291,891 | B2 | 10/2012 | Alger, II et al. |
| 8,316,829 | B2 | 11/2012 | Piper et al. |
| 8,418,680 | B2 | 4/2013 | Zitzler et al. |
| 8,566,006 | B2 | 10/2013 | Gibble |
| 8,733,081 | B2 | 5/2014 | Miyashita |
| 8,915,081 | B2 | 12/2014 | Hayman et al. |
| 8,931,462 | B2 * | 1/2015 | Pappenheimer ...... F02D 41/005 123/198 F |
| 8,944,035 | B2 * | 2/2015 | Freund ................... F02D 21/08 123/568.11 |
| 9,002,624 | B2 * | 4/2015 | Kerns ..................... F02D 13/06 123/198 DB |
| 9,080,536 | B2 * | 7/2015 | Flynn .................. F02M 25/0722 |
| 9,109,545 | B2 * | 8/2015 | Klingbeil ............ F02D 41/0085 |
| 2002/0195087 | A1 | 12/2002 | Dunsworth et al. |
| 2004/0139944 | A1 | 6/2004 | Nakano et al. |
| 2004/0177605 | A1 | 9/2004 | Kojima et al. |
| 2004/0194463 | A1 | 10/2004 | Yanagisawa et al. |
| 2009/0013969 | A1 | 1/2009 | Winstead |
| 2009/0241918 | A1 | 10/2009 | Shinagawa |
| 2009/0308070 | A1 | 12/2009 | Alger, II et al. |
| 2010/0043762 | A1 | 2/2010 | Weiss et al. |
| 2010/0100299 | A1 | 4/2010 | Tripathi et al. |
| 2010/0211294 | A1 | 8/2010 | Soejima |
| 2011/0023829 | A1 | 2/2011 | Miyashita |
| 2011/0030657 | A1 | 2/2011 | Tripathi et al. |
| 2011/0048372 | A1 | 3/2011 | Dibble et al. |
| 2011/0253113 | A1 | 10/2011 | Roth et al. |
| 2011/0265454 | A1 | 11/2011 | Smith et al. |
| 2011/0283682 | A1 | 11/2011 | Gallagher et al. |
| 2011/0289904 | A1 | 12/2011 | Miyashita |
| 2011/0307127 | A1 | 12/2011 | Swenson et al. |
| 2012/0042633 | A1 | 2/2012 | Silvestri et al. |
| 2012/0046853 | A1 | 2/2012 | Silvestri et al. |
| 2012/0055444 | A1 | 3/2012 | Tobergte et al. |
| 2012/0078492 | A1 | 3/2012 | Freund et al. |
| 2012/0216530 | A1 | 8/2012 | Flynn et al. |
| 2012/0298070 | A1 | 11/2012 | Akinyemi et al. |
| 2012/0323465 | A1 | 12/2012 | Peters et al. |
| 2012/0323470 | A1 | 12/2012 | Klingbeil et al. |
| 2013/0024086 | A1 | 1/2013 | Henry et al. |
| 2013/0144512 | A1 | 6/2013 | Coplin et al. |
| 2014/0034014 | A1 | 2/2014 | Blythe et al. |
| 2015/0354482 | A1 | 12/2015 | Leone et al. |

FOREIGN PATENT DOCUMENTS

| | | |
|---|---|---|
| DE | 19838725 A1 | 3/2000 |
| DE | 102009028354 A1 | 2/2011 |
| EP | 1146220 A1 | 10/2001 |
| WO | 2011017272 A1 | 2/2011 |
| WO | 2013029760 A1 | 3/2013 |
| WO | 2013112173 A1 | 8/2013 |

OTHER PUBLICATIONS

Lin, Z. et al., "A Study of Optimization of the Air/Fuel Ratio and It's Effect on Exhaust Emission of a CNG Port Injection QHCCI Engine," Journal of Engineering Thermophysics, vol. 22, Supp. 1, Jun. 2001, 4 pages.

Saraf, R. et al., "Lambda Characterization of Diesel-CNG Dual Fuel Engine," 2009 Second International Conference on Environmental and Computer Science (ICECS'09), Dec. 28, 2009, Dubai, 5 pages.

ISA European Patent Office, International Search Report and Written Opinion Issued in Application No. PCT/US2012/038496, dated Oct. 8, 2012, WIPO, 11 pages.

(56) References Cited

OTHER PUBLICATIONS

ISA European Patent Office, International Search Report and Written Opinion Issued in Application No. PCT/US2013/047503, dated Dec. 10, 2013, WIPO, 9 pages.
Wallace et al., "Initial Development of an Experimental Automotive Uniflow 2-Stroke Diesel Engine", Energy Conversion Engineering Conference, Proceedings of the 31st Intersociety, vol. No. 2, pp. 730-735, Aug. 11-16, 1996.
Unofficial English Translation of Chinese Office Action issued in connection with related CN Application No. 201380040841.9 dated Sep. 5, 2016.

* cited by examiner

SYSTEMS AND METHODS FOR ENGINE CONTROL

CROSS-REFERENCE TO RELATED APPLICATIONS

This application is a continuation-in-part of U.S. application Ser. No. 13/113,138 entitled, "METHOD FOR EXHAUST GAS RECIRCULATION RATE CONTROL," filed May 23, 2011. This application is also a continuation-in-part of U.S. application Ser. No. 14/632,028 entitled, "SYSTEMS AND METHODS FOR CONTROLLING EXHAUST GAS RECIRCULATION," filed Feb. 26, 2015, which is a continuation of U.S. patent application Ser. No. 13/562,356, "SYSTEMS AND METHODS FOR CONTROLLING EXHAUST GAS RECIRCULATION," filed Jul. 31, 2012 and now U.S. Pat. No. 8,985,088 issued Mar. 24, 2015. This application is also a continuation-in-part of U.S. application Ser. No. 14/450,493 entitled, "SYSTEM AND METHOD FOR CONTROLLING OPERATION OF AN ENGINE," filed Aug. 4, 2014. The aforementioned U.S. application Ser. Nos. 13/113,138, 14/632,028, 13/562,356, and 14/450,493 are hereby incorporated in their entireties herein by reference for all purposes.

FIELD

Embodiments of the subject matter disclosed herein relate to exhaust gas recirculation systems and methods.

BACKGROUND

An exhaust gas recirculation (EGR) system may be included in a combustion engine to reduce combustion temperatures and lower emissions. In one example, under selected conditions, an EGR system may exclusively couple an exhaust manifold of a first group of cylinders to an intake manifold of an engine, and not to the atmosphere. Such cylinders are referred to as donor cylinders. By providing EGR to an intake in such a manner, the effective oxygen content of the intake air may be reduced, thus lowering the combustion temperature and reducing production of emissions such as NOx.

BRIEF DESCRIPTION

In one embodiment, a method for controlling EGR in an engine comprises routing at least a portion of exhaust from a first exhaust manifold to an air intake manifold coupled to the engine, and not to atmosphere, the first exhaust manifold exclusively coupled to a first cylinder group. The method further includes routing exhaust from at least one additional exhaust manifold coupled to a corresponding at least one additional cylinder group to atmosphere, and during a first engine operating condition where an engine fuel demand is below a threshold demand, not injecting fuel to each of a subset of cylinders in the first cylinder group while injecting fuel to a subset of all cylinders coupled to the at least one additional exhaust manifold, where a number of cylinders of the subset of cylinders in the first cylinder group decreases in response to an increase in a target EGR rate.

By controlling fuel injection to not inject fuel to a subset of cylinders in the first cylinder group, an effective EGR rate to the intake (and thus delivered to all of the cylinders) can be controlled during the first engine operating condition, even when the physical structure of the donor cylinders is maintained. For example, the first engine operating condition may be idle mode. By not injecting fuel to a subset of cylinders in the first cylinder group, or donor cylinder group, a smaller ratio of the injected fuel, and thus the combusted fuel and exhaust, will be directed to EGR, thus decreasing the effective EGR rate. In other examples, the number of cylinders of the subset that does not receive fuel may be decreased to increase the effective EGR rate.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems for an engine with a plurality of donor cylinders and a plurality of non-donor cylinders. In one example embodiment, a method includes injecting fuel to each cylinder in a donor cylinder group while injecting fuel to a subset of cylinders of a non-donor cylinder group. The subset of cylinders in the non-donor cylinder group may vary from one combustion cycle to the next, or be maintained over a plurality of combustion cycles, or combinations thereof. Operating with some cylinders completing a cycle without combusting may be referred to as "skip firing". Operation with only selected cylinders being fired during each engine cycle may be carried out preferentially biased to the donor cylinders as described herein. For example, during preferential donor cylinder skip-fire operation, in one engine cycle, every cylinder from the donor cylinder group may be fired while at least one but fewer than all the cylinders of the non-donor cylinder group are fired. In this manner, across multiple engine cycles, the donor cylinders may fire more often than the non-donor cylinders, even though each non-donor cylinder may fire at some point. In order to maintain desired engine speed during the skip fire operation, the amount of total fuel injected to all cylinders may be controlled such that each individual cylinder receives a higher amount of fuel during skip fire than when more or all cylinders are firing during each combustion cycle. By doing so, the EGR introduced into the intake may have proportionately less oxygen during skip fire than during normal operation at the same engine speed and load, effectively increasing the EGR rate to the intake.

In some embodiments, the engine is configured to be positioned in a vehicle, such as a rail vehicle. The above described configuration may be particularly advantageous in a rail vehicle due to the sustained periods of low load operation rail vehicles may undergo, for example sitting at idle mode during loading and unloading of cargo, idling in the yard, or other idle operation. Likewise, the operation described herein may be particularly useful during low load dynamic braking operation wherein braking energy is either electrically dissipated or stored in a battery system. "low-load" operation may comprise a mode of operation of the engine where a relatively low amount of work is performed by the engine, for example, low-load operation may be less than 50% of engine load. Conversely, a "high-load" operation of the engine may comprise a mode of operation where a relatively higher amount of work is performed by the engine, for example operation at greater than 50% engine load.

Figure 1:
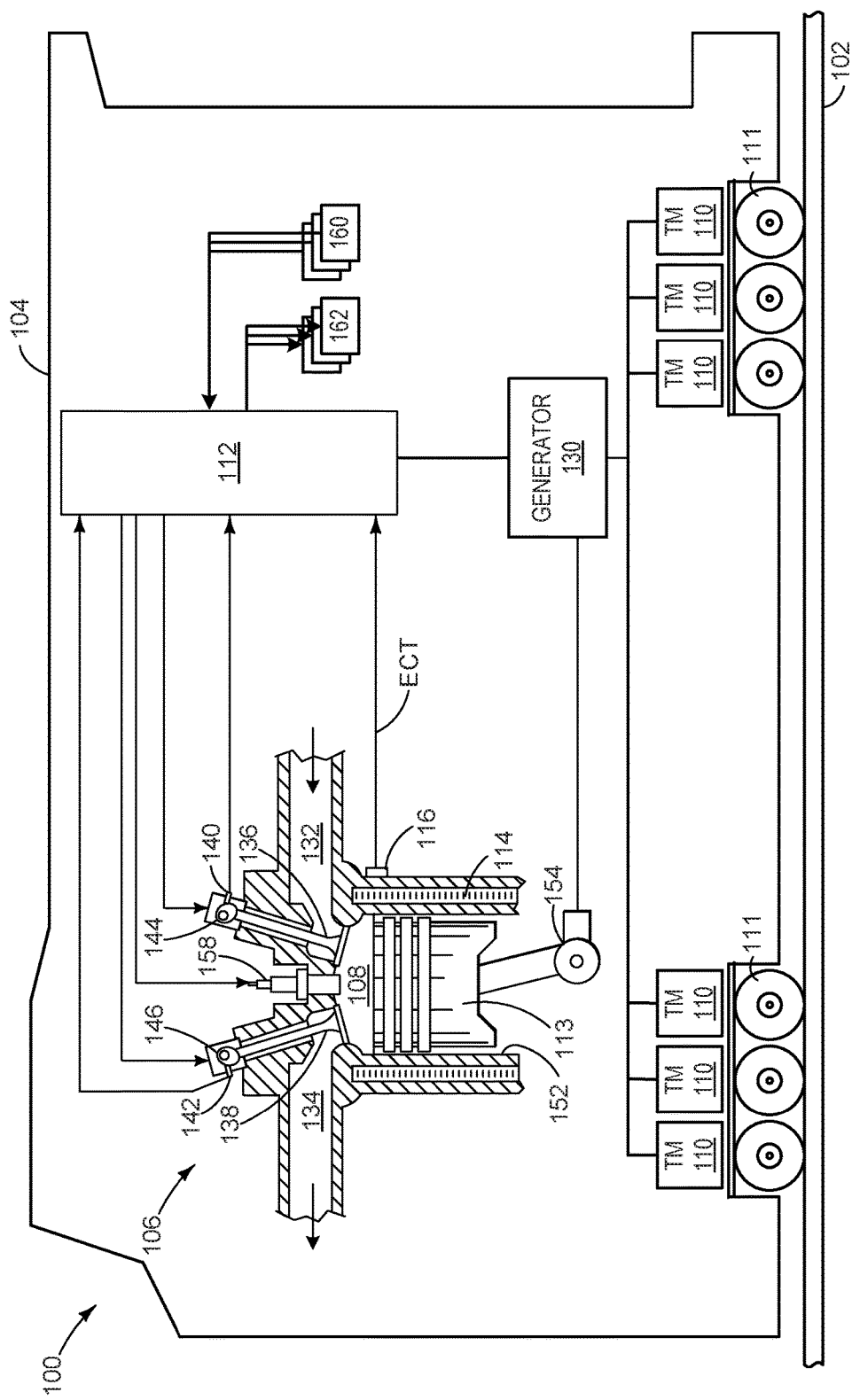
FIG. 1 shows a schematic diagram of an example embodiment of a rail vehicle with an engine according to an embodiment of the present disclosure.

With regard to FIG. 1, it shows a block diagram of an example embodiment of a vehicle system 100 (e.g., a locomotive system), herein depicted as a rail vehicle 104, configured to run on a rail 102 via a plurality of wheels 111. As depicted, the rail vehicle 104 includes an engine system with an engine 106 (described further with regard to FIG. 2). In other non-limiting embodiments, the engine system may be a stationary engine system, such as in a power-plant application, or an engine system in a ship, on-highway vehicle or off-highway vehicle propulsion system.

In one example, the rail vehicle 104 is a diesel-electric vehicle. For example, the engine system includes a diesel engine that generates a torque output that is transmitted to the generator 130. The generator 130 produces electrical power that may be stored and applied for subsequent propagation to a variety of downstream electrical components. For example, the generator 130 may provide electrical power to a plurality of traction motors 110. As depicted, the plurality of traction motors 110 are each connected to one of a plurality of wheels 111 to provide tractive power to propel the rail vehicle 104. One example rail vehicle configuration includes one traction motor per wheel. As depicted herein, six pairs of traction motors correspond to each of six pairs of wheels of the rail vehicle.

FIG. 1 depicts an example embodiment of a combustion chamber, or cylinder, of a multi-cylinder internal combustion engine 106. The engine 106 may be controlled at least partially by a control system including controller 112. In one example, the controller 112 includes a computer control system. The controller 112 may further include computer readable storage media (not shown) including code for enabling on-board monitoring and control of rail vehicle operation. The controller 112, while overseeing control and management of the vehicle system 100, may be configured to receive signals from a variety of engine sensors in order to determine operating parameters and operating conditions, and correspondingly adjust various engine actuators to control operation of the rail vehicle 104. For example, the controller 112 may receive a signal from a notch throttle (not shown) indicating an operator desired power output. The controller 112 may further receive signals from various engine sensors including, but not limited to, engine speed, engine load, boost pressure, exhaust pressure, ambient pressure, $CO_2$ levels, exhaust temperature, NOx emissions, engine coolant temperature (ECT) from temperature sensor 116 coupled to cooling sleeve 114, etc. Correspondingly, the controller 112 may control the vehicle system 100 by sending commands to various components such as traction motors, alternator, cylinder valves, throttle, fuel injectors, etc.

The cylinder (i.e., combustion chamber) 108 of engine 106 may include combustion chamber walls 152 with a piston 113 positioned therein. The piston 113 may be coupled to a crankshaft 154 so that reciprocating motion of the piston is translated into rotational motion of the crankshaft. In some embodiments, the engine 106 may be a four-stroke engine in which each of the cylinders fires in a firing order during two revolutions of the crankshaft 154. In other embodiments, the engine 106 may be a two-stroke engine in which each of the cylinders fires in a firing order during one revolution of the crankshaft 154.

The cylinder 108 receives intake air for combustion from an intake passage 132. The intake passage 132 receives ambient air from an air filter (not shown) that filters air from outside of the rail vehicle 104. The intake air passage 132 may communicate with other cylinders of engine 106 in addition to cylinder 108, for example.

Exhaust gas resulting from combustion in the engine 106 is supplied to an exhaust passage 134. Exhaust gas flows through the exhaust passage 134, to a turbocharger (not shown in FIG. 1) and out of an exhaust stack (not shown) of the rail vehicle 104. The exhaust passage 134 can further receive exhaust gases from other cylinders of engine 106 in addition to cylinder 108, for example. Further, an exhaust gas treatment system (not shown) including one or more exhaust gas treatment devices may be coupled to the exhaust passage 134. For example, the exhaust gas treatment system may include a selective catalytic reduction (SCR) system, a diesel oxidation catalyst (DOC), a diesel particulate filter (DPF), various other emission control devices, or combinations thereof.

In some embodiments, as will be described in greater detail below with reference to FIG. 2, the vehicle system may include more than one exhaust passage. For example, one group of cylinders may be coupled to a first exhaust manifold and another group of cylinders may be coupled to a second exhaust manifold. In this way, one of the groups of cylinders may be comprised exclusively of donor cylinders which recirculate exhaust gas to the intake passage 132 under selected operating conditions.

Continuing with FIG. 1, each cylinder of the engine 106 may include one or more intake valves and one or more exhaust valves. For example, the cylinder 108 is shown including at least one intake poppet valve 136 and at least one exhaust poppet valve 138 located in an upper region of cylinder 108. In some embodiments, each cylinder of the engine 106, including cylinder 108, may include at least two intake poppet valves and at least two exhaust poppet valves located at the cylinder head.

The intake valve 136 may be controlled by the controller 112 via actuator 144. Similarly, the exhaust valve 138 may be controlled by the controller 112 via actuator 146. During some conditions, the controller 112 may vary the signals provided to actuators 144 and 146 to control the opening and closing of the respective intake and exhaust valves. The position of intake valve 136 and exhaust valve 138 may be determined by respective valve position sensors 140 and 142, respectively. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In some embodiments, each cylinder of engine 106 may be configured with one or more fuel injectors for providing fuel thereto. As a non-limiting example, FIG. 1 shows the cylinder 108 is including a fuel injector 158. The fuel injector 158 is shown coupled directly to cylinder 108 for injecting fuel directly therein. In this manner, fuel injector 158 provides what is known as direct injection of a fuel into combustion cylinder 108. The fuel may be delivered to the fuel injector 158 from a high-pressure fuel system including a fuel tank, fuel pumps, and a fuel rail (not shown). In one example, the fuel is diesel fuel that is combusted in the engine through compression ignition. In other non-limiting embodiments, the second fuel may be gasoline, kerosene, biodiesel, or other petroleum distillates of similar density through compression ignition (and/or spark ignition).

The controller 112 at least partially controls operation of the vehicle system 100 and the engine 106. The controller 112 includes a microprocessor unit (e.g., a processor) and an electronic storage medium (a.k.a., a computer-readable storage medium). For example, the computer-readable storage medium includes one or more of a read-only memory chip, random access memory, etc. The computer readable storage medium holds instructions that when executed by the microprocessor unit executes programs for controlling operation of the engine 106 as well as methods discussed in further detail below with reference to FIGS. 3-5 and FIGS. 9-11.

The controller 112, while overseeing control and management of the vehicle system 100, is configured to receive signals from a variety of engine sensors 160 in order to determine operating parameters and operating conditions, and correspondingly adjust various engine actuators 162 to control operation of the vehicle system 100. For example, the controller 112 receives sensor signals indicative of air-fuel ratio, engine speed, engine load, engine temperature, ambient temperature, intake manifold temperature, exhaust temperature, intake manifold pressure (boost pressure), exhaust pressure, ambient altitude, intake manifold oxygen concentration, combustion stability, particulate matter concentration, and NOx emissions etc. For example, the controller 112 adjusts actuators including fuel injectors, intake and exhaust valves, bypass valves, flow valves, etc. In some embodiments, the controller 112 controls a frequency and/or duration of fuel injection individually for each fuel injector 158 of the engine 106. For example, under some conditions, an amount of fuel injected into cylinders of a first cylinder group is different than an amount of fuel injected into cylinders of a second cylinder group. Furthermore, under some conditions, a number of cylinders in which fuel is injected differs between different cylinder groups.

As another example, one of the sensing devices 160 includes a global positioning system (GPS) receiver. The controller 112 determines (e.g., through estimation or calculation) a geographic position (e.g., coordinates) of the vehicle system 100 using signals from GPS receiver. Geographic features in the path of the vehicle system 100, such as features on or around the rail 102 of the vehicle system 100, is signaled by an operator or calculated. In some implementations, the sensing devices 160 include a route-feature database. The route-feature database includes information describing different features and regulations that are considered as environmental conditions on a route of the vehicle system 100. In one example, designated geographic features and their respective GPS positions are stored in the route-feature database. A distance between the vehicle system 100 and any one of the set of designated geographic features is calculated so that the nearest geographic feature and its distance are determined. Non-limiting examples of geographic features that are stored in a set of designated geographic features include a tunnel, a tunnel entrance, a tunnel exit, a geographic region having different emissions restrictions, a steep grade, a city boundary, and a restricted speed boundary. Further, the route-feature database includes stored information about the predefined geographic features, such as length of a tunnel and grade of the tunnel.

In one example, the controller 112 is operable to determine a tunnel condition based on information received from the GPS receiver and/or route-feature database. For example, a tunnel condition includes operation of the vehicle system within a tunnel. Further, the beginning and end of the tunnel condition are determined in order to accurately adjust operation of the vehicle system. In another example, the controller 112 is operable to determine a tunnel condition based on ambient temperature and intake manifold oxygen concentration.

In some embodiments, the controller 112 may control a frequency and/or duration of fuel injection individually for each fuel injector 158 of engine 106. For example, during skip fire operation, a first fuel injector may be controlled to inject a higher amount of fuel than a second fuel injector, which may be controlled to inject no fuel.

Figure 2:
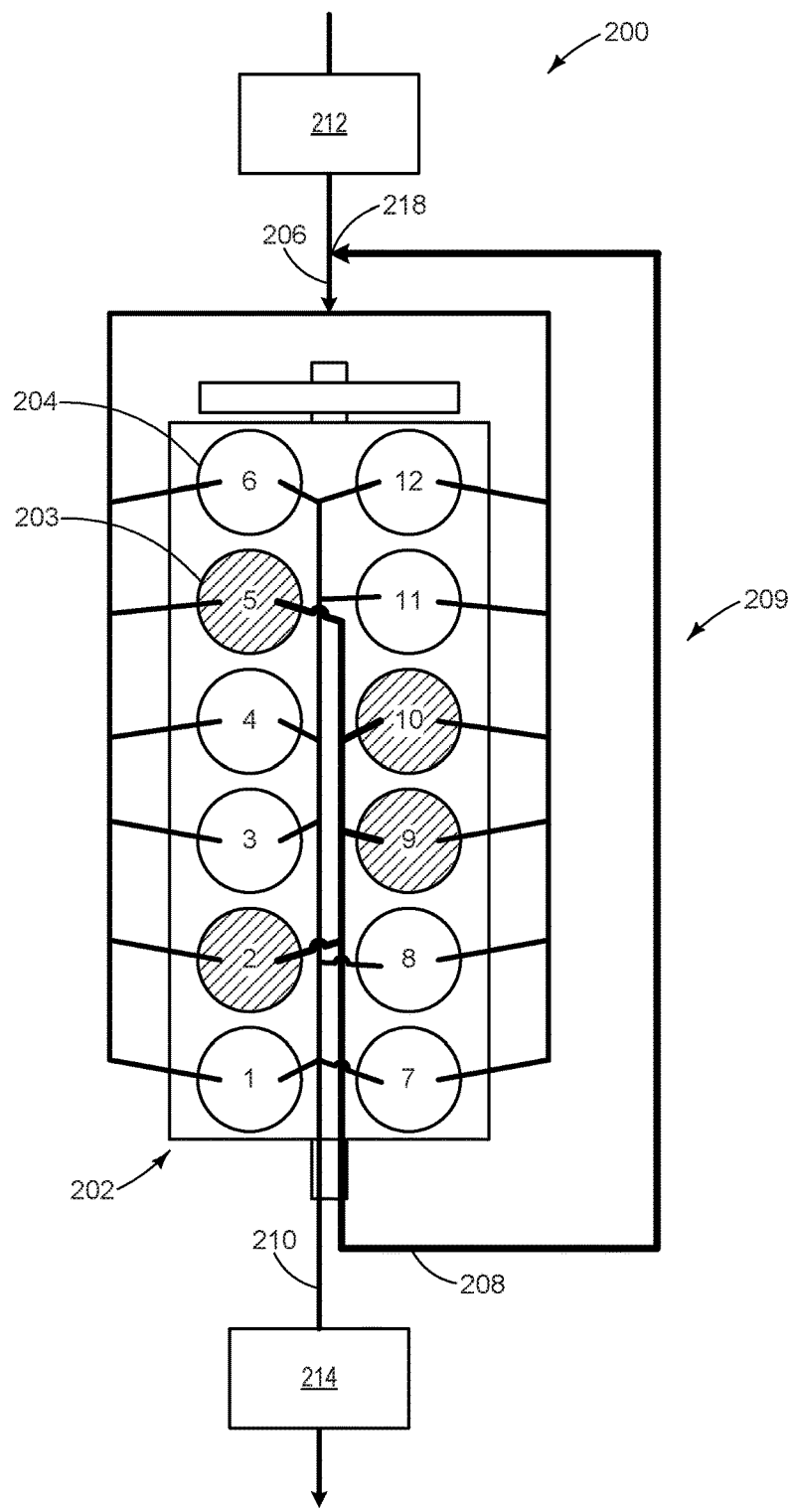
FIG. 2 shows a schematic diagram of an example embodiment of an engine with a plurality of donor cylinders and a plurality of non-donor cylinders.

FIG. 2 shows an example embodiment of a system 200 with an engine 202, such as engine 106 described above with reference to FIG. 1, having a plurality of donor cylinders 203 and a plurality of non-donor cylinders 204. In the example embodiment of FIG. 2, the engine 202 is a V-12 engine having twelve cylinders. In other examples, the engine may be a V-6, V-8, V-10, V-16, I-4, I-6, I-8, opposed 4, or another engine type.

In the example embodiment of FIG. 2, the donor cylinders 203 are depicted as a first group of cylinders comprising four cylinders (e.g., cylinders labeled 2, 5, 9, and 10). The non-donor cylinders 204 are depicted as a second group of cylinders comprising eight cylinders (e.g., cylinders labeled 1, 3, 4, 6, 7, 8, 11, and 12). In other embodiments, the engine may include at least one donor cylinder and at least one non-donor cylinder. For example, the engine may have six donor cylinders and six non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 2, the donor cylinders 203 are coupled to a first exhaust manifold 208 which is part of an exhaust gas recirculation (EGR) system 209. The first exhaust manifold 208 is coupled to the exhaust ports of the donor-cylinders. As such, in the present example, the donor cylinders 203 are coupled exclusively to the first exhaust manifold 208. Exhaust gas from each of the donor cylinders 203 is routed through the EGR system 209 to an exhaust gas inlet 218 in the intake passage 206

In the example embodiment illustrated in FIG. 2, the non-donor cylinders 204 are coupled to a second exhaust manifold 210. The second exhaust manifold 210 is coupled to the exhaust ports of at least the non-donor-cylinders, but, in some examples, may be coupled to exhaust ports of the donor cylinders. For example, exhaust gas from one or more of the donor cylinders may be directed to the second exhaust manifold 210 via a valve such that the amount of EGR may be reduced as desired, for example, during selected operating conditions. In the present example, the non-donor cylinders 204 are coupled exclusively to the second exhaust manifold 210. Exhaust gas from the non-donor cylinders 204 flows to an exhaust system 220. The exhaust system may include exhaust gas treatment devices, elements, and components, for example, a diesel oxidation catalyst, a particulate matter trap, hydrocarbon trap, an SCR catalyst, etc., as described above. Further, in the present example, exhaust gas from the non-donor cylinders 204 drives a turbine 214 of a turbocharger.

In embodiments in which the engine is a V-engine, the exhaust manifolds 208 and 210 may be inboard exhaust manifolds. For example, the exhaust ports of each of the cylinders are lined up on the inside of the V-shape. In other embodiments, the exhaust manifolds 208 and 210 may be outboard exhaust manifolds. For example, the exhaust ports of each of the cylinders are lined up on the outside of the V-shape.

As depicted in FIG. 2, the engine 202 is configured with a turbocharger including the exhaust turbine 214 arranged along the second exhaust manifold 210, and a compressor 212 arranged in the intake passage 206. The compressor 212 may be at least partially powered by the exhaust turbine 214 via a shaft (not shown). As shown in FIG. 2, the exhaust gas inlet 218 is downstream of the compressor 212 in the intake passage 206. The turbocharger increases air charge of ambient air drawn into the intake passage 206 in order to provide greater charge density during combustion to increase power output and/or engine-operating efficiency. While in this case a single turbocharger is included, the system may include multiple turbine and/or compressor stages.

Further, as shown in FIG. 2, at least two of the donor cylinders 203 may be positioned contiguously (e.g., immediately adjacent to one another) in an engine bank. As an example, engine 202 may be a V-engine with two engine banks. For example, cylinders 1-6 are disposed in one bank and cylinders 7-12 are disposed in the other bank. In the present example, donor cylinders 9 and 10 are contiguous. In such a configuration, a size of the first exhaust manifold 208 may be reduced, and therefore, a volume of space occupied by the first exhaust manifold 208 may be reduced, for example, as the donor cylinders are positioned adjacent each other. Thus, the engine may be positioned in a vehicle in which packaging space is limited, such as a locomotive, for example.

In a V-12 engine, such as depicted in FIG. 2, the engine may have a cylinder firing order such as 1-7-5-11-3-9-6-12-2-8-4-10, for example, in which cylinder 1 fires first, cylinder 7 fires second, cylinder 5 fires third, and so on. In other examples, the cylinders may have a different firing order. During normal, non-skip fire conditions, each cylinder is fired once every engine cycle, or once every 720 crankshaft degrees, according to the cylinder firing order. In the embodiment depicted in FIG. 2, the engine 202 comprises four donor cylinders, and thus in non-skip fire conditions, four out of twelve fired cylinders are donor cylinders. As a result, approximately 33% of the gasses inducted into the cylinders may derive from the donor cylinders.

During non-preferential skip fire operation, a subset of the donor and non-donor cylinders are fired each engine cycle. The number of cylinders fired each cycle may be selected based on operating conditions such as fuel demand. The cylinders in each subset may change each engine cycle such that every cylinder is skipped at least once within a predetermined number of engine cycles. Further, within the predetermined number of engine cycles, every cylinder, including both donor and non-donor cylinders, is fired the same amount of times.

During preferential donor cylinder skip fire conditions, the donor cylinders may comprise a different proportion of the fired cylinders. For example, during a preferential skip fire routine wherein the donor cylinders are preferentially fired, the donor cylinders may comprise four out of nine fired cylinders, or four out of six fired cylinders, or in some embodiments, the donor cylinders may be the only cylinders fired. Any proportion of donor cylinders fired is within the scope of this disclosure. The proportion of donor cylinders fired may be selected based upon a desired effective EGR rate to reduce NOx levels. For example, in the case of 4 donor cylinders and 8 non-donor cylinders, if half of the non-donors are skip-fired and none of the donor cylinders are skip-fired, then the effective EGR rate is increased from 33% to 50%.

Figure 3:
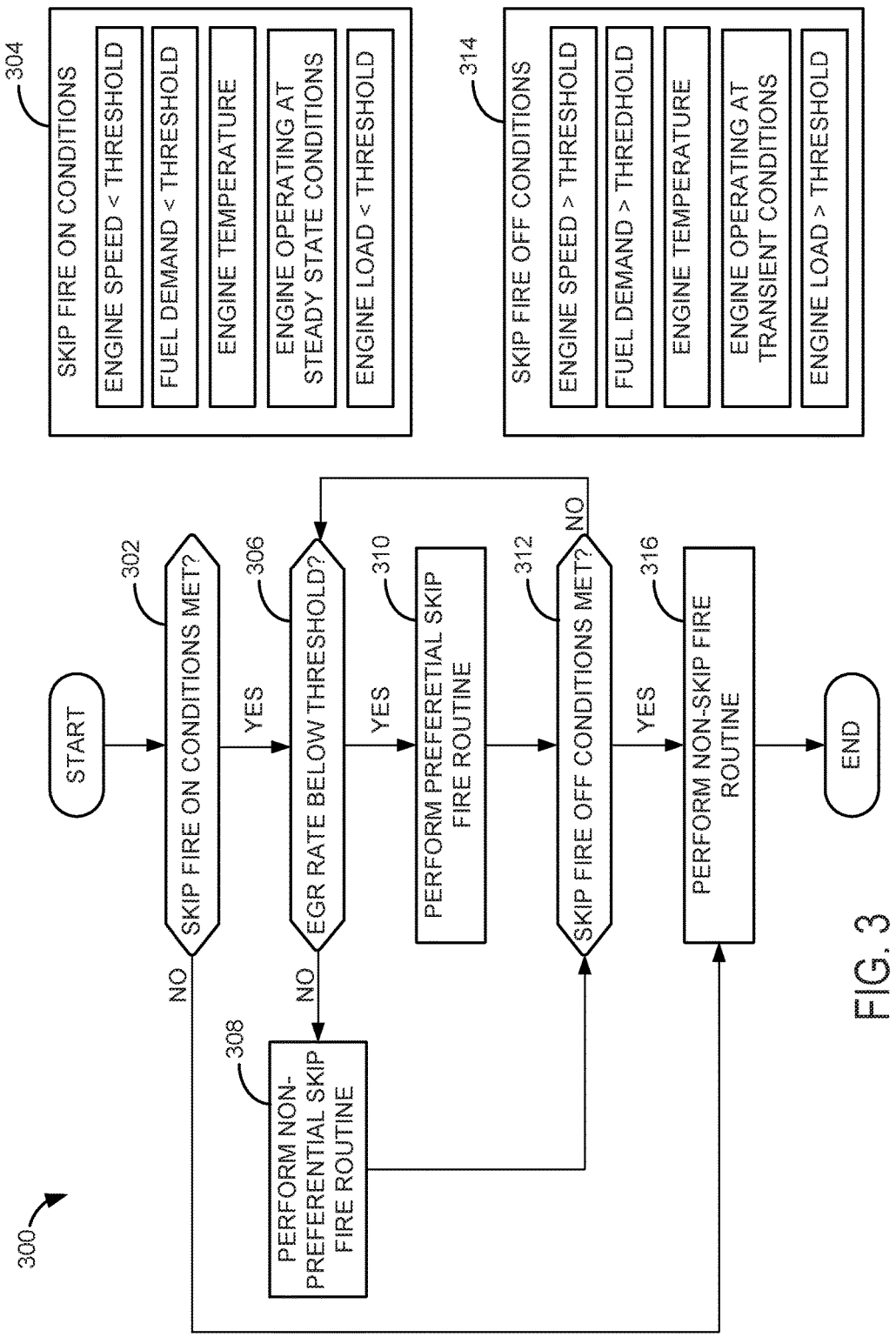
FIG. 3 shows a flow chart illustrating an example routine for determining a cylinder firing protocol.
Figure 4:
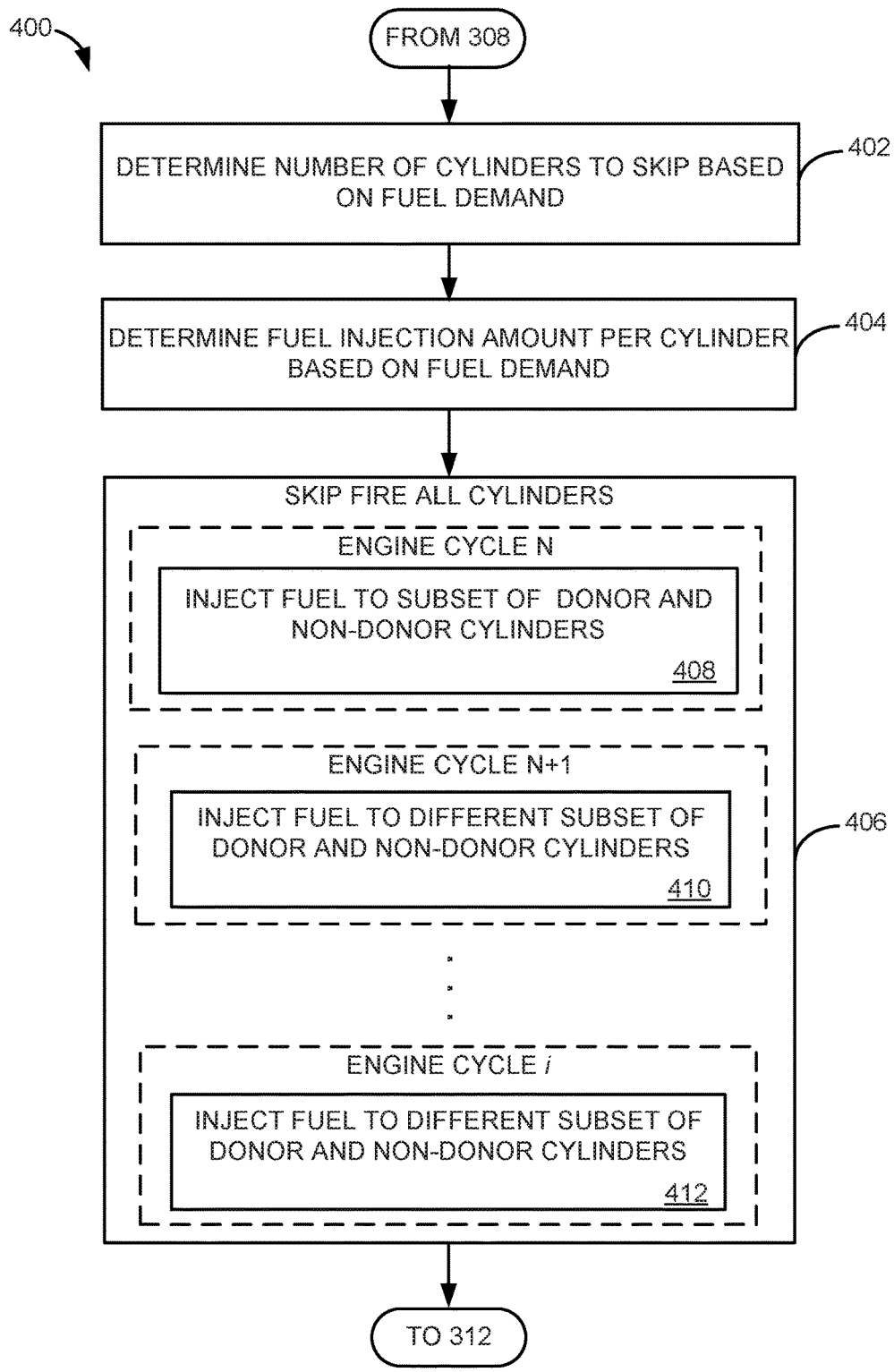
FIG. 4 shows a flow chart of an example method for performing a non-preferential skip fire routine.
Figure 5:
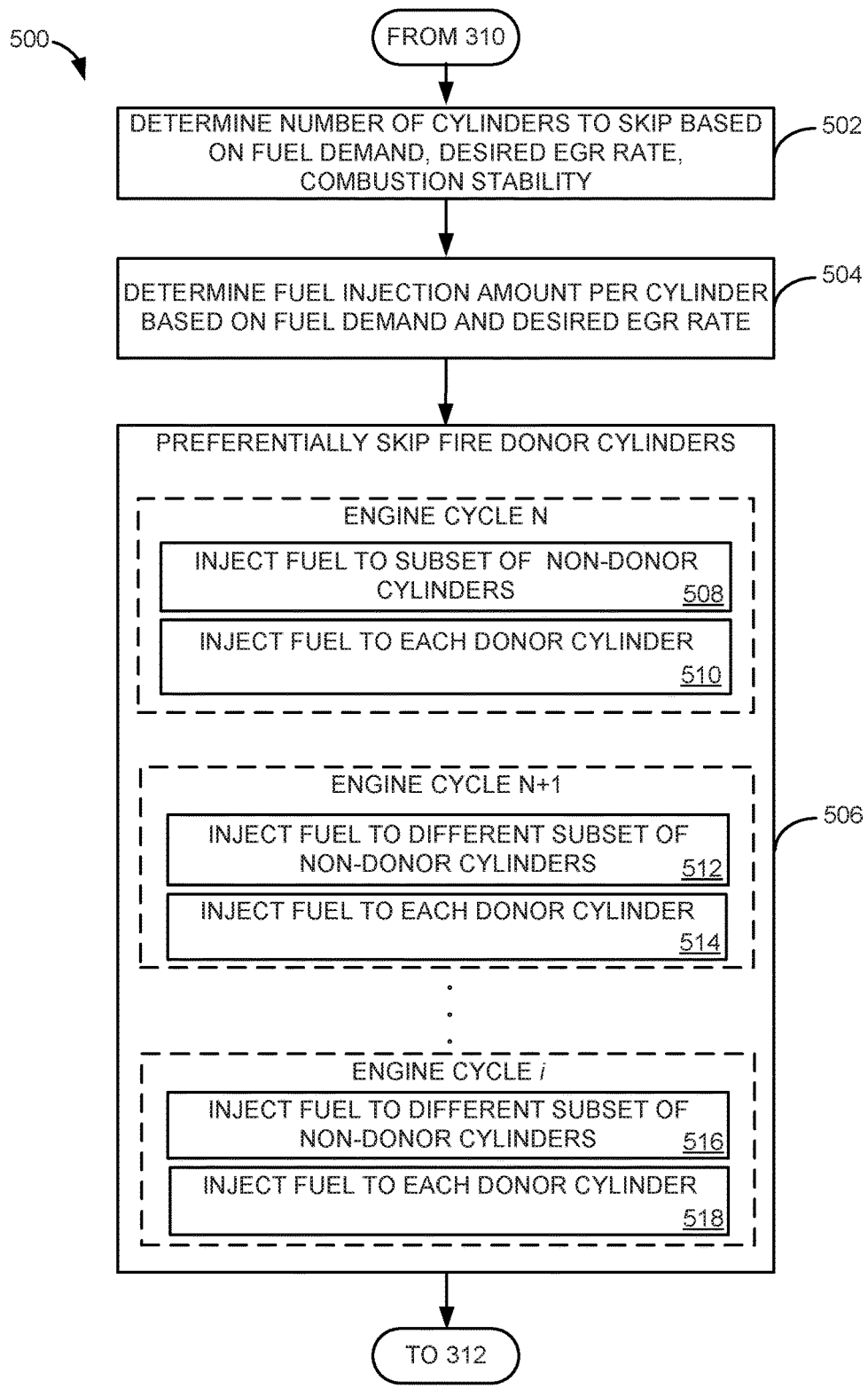
FIG. 5 shows a flow chart of an example method for performing a preferential donor cylinder skip fire routine.

Additional examples of operation among the various operating modes are described further with regard to FIGS. 3-5. FIG. 3 shows an example routine for an engine controller to determine a cylinder firing protocol, for example a preferential donor cylinder skip fire protocol or a non-preferential skip fire protocol. FIG. 4 shows a method for carrying out a non-preferential skip fire routine, and FIG. 5 shows a method for carrying out a preferential donor cylinder skip fire routine.

Turning to FIG. 3, a flow chart depicts a routine 300 for determining a cylinder firing protocol. Routine 300 may be carried out by controller 112 of engine 106, for example. Routine 300 may additionally or alternatively be carried out by controller 654, controller 754, or controller 854, which will be described in more detail below with respect to FIGS. 6-8, respectively. Routine 300 comprises, at 302, determining if skip fire on conditions 304 have been met. Skip fire on conditions 304 may be based on one or a combination of various engine operating parameters. These conditions may include engine speed, fuel demand, and engine load being below predetermined respective thresholds. For example, during idle mode, engine speed may be low, such as 250 RPMs, and an operator may be requesting a low load setting on a notch throttle (e.g. idle notch). Thus, fuel demand, which is based on speed, load, and operating conditions such as engine temperature, manifold pressure, etc., may be too low, for example less than 180 $mm^3$ fuel per cylinder, to accurately deliver the desired amount of fuel. Additionally, skip fire operation may mitigate problems with cold engine operation, and as such, skip fire on conditions may be based on engine temperature. Skip fire on conditions may further be based on the controller sensing the engine is in a steady state operating condition, as transient operating conditions may require a fluctuating fuel demand. Steady state operating conditions may be determined by an amount of time spent at current throttle notch position, or any suitable method.

If skip fire on conditions are not met, routine 300 advances to 316 to initiate a non-skip fire routine. If conditions to initiate a skip fire routine are met, routine 300 advances to 306 and determines if an EGR rate is below a threshold. The EGR rate may be determined by a ratio of an amount of $CO_2$ in an intake manifold to an amount of $CO_2$ in the exhaust, as sensed by $CO_2$ sensors. The EGR rate may also be inferred from an amount of NOx in the exhaust, or any suitable mechanism. Target EGR rate may be determined based on a various engine operating conditions, including, for example, engine load, engine speed, combustion stability, and NOx emissions. If it is determined at 306 that the effective EGR rate is not below a desired rate, routine 300 advances to perform a non-preferential skip fire routine at 308. If it is determined at 306 that the effective EGR rate is below a desired rate, routine 300 advances to 310 to perform a preferential skip fire routine.

It is to be understood that the operations described above need not be carried out in the exact order described. In some embodiments, routine 300 may first determine that the EGR rate is below a threshold, and perform a preferential donor cylinder skip fire protocol even if the skip fire on conditions have not been met. For example, if the EGR rate is below a threshold and fuel demand is above the skip fire threshold, preferential donor cylinder skip fire may still be performed to increase the EGR rate.

Regardless of whether preferential or non-preferential skip fire operation is performed, routine 300 comprises, at 312, determining if skip fire off conditions are met. Once a skip fire routine is initiated, a predetermined period of time (e.g. one engine cycle) may elapse after which routine 300 may determine whether the conditions for skip fire on are still met, or whether conditions for skip fire off are met. Skip fire off conditions 314 may be based on one or more of engine speed, fuel demand, and engine load being above predetermined respective thresholds (e.g. engine operating in a middle or high-load mode), engine temperature, and transient engine operating conditions. If skip fire off conditions are not met at 312, the skip fire on routine may continue, and routine 300 may loop back to determine if EGR remains at a desired rate at 306. If skip fire off conditions are met at 312, routine 300 may advance to 316 to initiate a non-skip fire cylinder protocol, such as a standard cylinder firing protocol where all the cylinders are fired equally, or a protocol where no cylinders are fired, in order to initiate engine shut-down.

FIG. 4 is a flow chart of an example method 400 for performing a non-preferential skip fire routine. Method 400 may be performed as part of routine 300. Method 400 comprises, at 402, determining a number of cylinders to skip based on fuel demand. For example, during low-load engine mode, a fuel injection amount to each cylinder may be too small to be accurately delivered, and thus a number of cylinders to skip may be chosen to increase the fuel injection to the fired cylinders to an amount that can be delivered accurately. Fuel injection amounts to each fired cylinder may be determined based on fuel demand and the number of fired cylinders at 404. For example, if at 402 six out of twelve cylinders were selected to be skipped, the amount of fuel needed to meet desired fuel demand would be distributed to the remaining six cylinders, and thus each fired cylinder would receive a higher amount (e.g. twice the amount) of injected fuel than if all cylinders were fired. Method 400 further comprises, at 406, skip firing all cylinders. During engine cycle N, or the first engine cycle of the skip fire routine, fuel is injected to a subset of the donor and non-donor cylinders at 408. Following completion of engine cycle N, every cylinder in the subset will have fired, and in engine cycle N+1, the cylinders in the subset changes, such that fuel is injected to a different subset of donor and non-donor cylinders at 410. The subsets may be chosen based on fuel demand, and may distributed in such a manner to equally balance cylinder firing across multiple engine cycles. For example, engine 202 is a 12 cylinder engine with a firing order of 1-7-5-11-3-9-6-12-2-8-4-10. If six cylinders are fired, method 400 may fire cylinders 1-5-3-6-2-4 in the subset of engine cycle N and fire cylinders 7-11-9-12-8-10 in the subset of engine cycle N+1. In this way, each cylinder is fired once every two engine cycles. However, any suitable skip fire order is within the scope of this disclosure. At 412, method 400 comprises injecting fuel to a subset of donor and non-donor cylinders during engine cycle i. Engine cycle i represents any number of engine cycles within the skip fire routine, and the cylinders in the subset of fired cylinders may be similar to the subset of engine cycle N, may be similar to the subset of engine cycle N+1, or may be a different subset, depending on the chosen distribution of cylinder firing across the engine cycles.

In this way, a skip fire protocol may be performed whereby some cylinders are skipped each cycle. The remaining cylinders may receive an increased amount of fuel to increase the accuracy of fuel delivery. Each engine cycle, the cylinders that are skipped alternate in order to equally distribute the thermal load across all cylinders. Thus, across a predetermined number of engine cycles, every cylinder will be skipped equally.

Turning to FIG. 5, a flow chart of an example method 500 for performing a preferential skip fire routine is illustrated. Method 500 may be performed as part of routine 300. Method 500 comprises, at 502, determining a number of cylinders to skip based on fuel demand, desired EGR rate, and combustion stability. For example, during low-load engine mode, a fuel injection amount to each cylinder may be too small to be accurately delivered, and thus a number of cylinders to skip may be chosen to increase fuel injection amount to the fired cylinders to an amount that can be delivered accurately. Further, an effective EGR rate may be also required. EGR rate prior to initiation of a skip fire protocol may be determined based on relative concentrations of carbon dioxide in the intake vs. the exhaust, according to the following equation:

$$\frac{[CO_2 \text{intake}]}{[CO_2 \text{exhaust (total)}]}$$

In the example engine 202 as described above with respect to FIG. 2, wherein the four donor cylinders provide all their exhaust to the intake, where $CO_2$ production in each cylinder may be estimated based on fueling, and the total fuel demand remains constant across the cylinders, the EGR rate prior to skip fire may be determined by:

$$\frac{4\left(\frac{1}{12}x\right)}{12\left(\frac{1}{12}x\right)} = 0.33$$

Where x is the total amount of exhaust $CO_2$ produced as a result of combustion of the delivered fuel, and therefore $\frac{1}{12}x$ is the fraction of exhaust $CO_2$ produced in each cylinder, 4 is the number of donor cylinders providing exhaust gas to the intake, and 12 is the total number of cylinders. If a measured EGR rate is below a desired amount, a number of non-donor cylinders may be skipped to increase the effective EGR rate.

In a first example, one non-donor cylinder may be skipped per engine cycle. As a result, the fuel will be redistributed to eleven cylinders, and thus each fired cylinder will produce $\frac{1}{11}x$ of the total exhaust $CO_2$. The EGR rate in the combusting cylinders attained by skipping one non-donor cylinder may be calculated:

$$\frac{4\left(\frac{1}{11}x\right)}{11\left(\frac{1}{11}x\right)} = 0.36$$

As the amount of fuel to each cylinder increases, the amount of combusted gasses (e.g. $CO_2$) produced by each cylinder increases by an equal amount. In the equation above, eleven cylinders contribute to the $CO_2$ production of the engine. However, as the skipped cylinder still intakes and exhausts intake gasses, the total volume of intake and exhaust gas does not change compared to operation with all twelve cylinders firing, only the proportion of $CO_2$ produced in each cylinder, and thus the proportion of $CO_2$ in the intake.

To increase the effective EGR rate by a larger amount, more cylinders may be skipped each cycle. In a second example, two non-donor cylinders may be skipped each cycle, with the fuel, and thus the $CO_2$ production, being distributed to ten cylinders each cycle and thus each cylinder produces $\frac{1}{10}x$ of the total $CO_2$, resulting in an effective EGR rate of:

$$\frac{4\left(\frac{1}{10}x\right)}{10\left(\frac{1}{10}x\right)} = 0.40$$

Effective EGR rates may be calculated in a similar manner for each number of cylinders skipped. Skipping three non-donor cylinders (and not skipping any donor cylinders) will result in an effective EGR rate of 0.44, skipping four non-donor cylinders will result in an effective EGR rate of 0.5, skipping five non-donor cylinders will result in an effective EGR rate of 0.57, and so on until all cylinders other than the donor cylinders are skipped, which will result in a maximum effective EGR rate.

It is to be understood that the effective EGR rates described above are referring to a proportion of the total carbon dioxide produced during combustion that is directed to the intake, and does not account for the fresh air that is also delivered to the cylinders. In other words, when operating with the maximum effective EGR rate, all of the carbon dioxide produced by combustion is routed back to the intake, but there is still fresh air delivered to each cylinder, and the non-donor cylinders still exhaust some carbon dioxide to the atmosphere. For example, in a configuration of six donor cylinders and six non-donor cylinders, the total volume of charge air admitted to each cylinder is still comprised of 50% fresh air, even when all non-donor cylinders are skipped.

Accordingly, the effective EGR rates described above may be represented as increases in the EGR rate over a baseline maximum EGR rate that occurs with no skip fire. In the example engine described above with four donor cylinders and eight non-donor cylinders, the baseline maximum EGR rate would be 0.33, as one-third of the engine is comprised of donor cylinders. When one non-donor cylinder is skip-fired, the EGR rate relative to the baseline would increase by 9%, when two non-donor cylinders are skip-fired, the EGR rate relative to the baseline would increase by 21%, and so forth, until the maximum achievable EGR rate is reached (which in this example would include tripling the baseline EGR rate). It is to be understood that in engine configurations having a different number of donor cylinders, different increases in the baseline maximum EGR rate would be possible. For example, if the engine is comprised of half donor cylinders (e.g., six donor cylinders and six non-donor cylinders), the maximum baseline EGR rate would be 0.5, and the maximum achievable EGR rate would include doubling the baseline EGR rate.

In another example, the effective EGR rate may be determined according to the following equation: $EGR=1/(1+F\_F*NumCyl/ND\_F-F\_F/FD\_F)$, where $F\_F$ is the fraction of cylinders that are fired in a 720° engine cycle (e.g., two rotations of the crankshaft), NumCyl is the total number of cylinders, $ND\_F$ is the number of donor cylinders that are fired in a 720° engine cycle and $FD\_F$ is the fraction of donors that are fired in a 720° engine cycle.

This may account for combinations of skipfire that may have uneven fueling between donor and non-donor cylinders. For an engine with four donors out of twelve cylinders where all the cylinders are fired, this leads to 33% EGR rate. When one non-donor is skipped, it leads to ~35.3% EGR rate. When two non-donor cylinders are skipped, it leads to 37.5% EGR rate. In the example where only donor cylinders are fired and all non-donor cylinders are skipped, it leads to 60% EGR rate.

The key is that the carbon dioxide concentration in the intake is increased (and hence the oxygen is decreased) up to the limiting case of doubling the carbon dioxide (if the engine is comprised of 50% donor cylinders). Mathematically, this would work out to the donors still only seeing a 50% actual EGR rate, but that EGR would be more oxygen deficient and so would control NOx better. The non-donor cylinders (since they are not firing in this case) would be exhausting exactly as much carbon dioxide as they are ingesting, but they would not (in this case) be injecting any fuel.

However, the EGR rate may be need to kept under a threshold in order to maintain combustion stability, as the diminished amount of oxygen in the intake as a result of the EGR may not be a high enough level to sustain combustion. On the other hand, very high levels of EGR may be useful at low load conditions where air/fuel ratios tend to be very high. As such, donor cylinders may be more preferentially fired (and thus non-donor cylinder more preferentially skipped) as engine load decreases and/or as air/fuel ratio increases, and vice versa. For the V-12 example with four donor cylinders, at a first, lower engine load, four of eight non-donor cylinders may be fired (and thus four skipped), while all four donor cylinders are fired each engine cycle, while at a second, higher engine load relative to the first load, two of eight non-donor cylinders may be skipped (and thus six fired) again with all non-donor cylinders firing in each engine cycle.

Further, it may be possible to perform preferential skipfire operation in donor cylinders by skipping more non-donor cylinders than donor cylinders, but yet still skipping at least one donor cylinder as well. For example, two non-donor cylinders may be skipped while skipping only one donor cylinder. Such operation may enable further refinement in the adjustment of the effective EGR rate.

Once a number of cylinders to skip to obtain a desired EGR rate has been determined at 502, the fuel injection amounts to each fired cylinder may be determined based on fuel demand, the number of injected cylinders, and the desired EGR rate at 504. For example, if at 502 six out of twelve cylinders were selected to be skipped, the amount of fuel needed to meet desired fuel demand would be distributed to the remaining six cylinders, and thus each fired cylinder would receive a higher amount (e.g. twice the amount) of injected fuel than if all cylinders were fired. However, if the number of skipped cylinders does not come close enough to reaching a desired EGR rate (for example, the desired EGR rate is 0.6 and skipping five cylinders results in a rate of 0.57 while skipping six cylinders results in a rate of 0.65), an amount of fuel delivered to each donor cylinder may be adjusted to reach the desired rate. Because the $CO_2$ production, and as a result the effective EGR rate, is proportional to an amount of fuel delivered to the donor cylinders, the amount of fuel injected to each donor cylinder may be increased or decreased, and an amount delivered to each fired non-donor cylinder may be adjusted accordingly to maintain required engine speed. Thus, the air/fuel ratio of the donor cylinders may be adjusted such that the air/fuel ratio of the donor cylinders is different from the air/fuel ratio of the non-donor cylinders. In this example, four donor cylinders would operate with fueling that is higher than the fueling delivered to the firing non-donor cylinders, where six non-donor cylinders are skipped each combustion cycle. Further, as described herein, among the six non-donor cylinders that are skipped each combustion cycle, a different subset may be skipped each cycle such that eventually each non-donor cylinder fires.

Continuing with FIG. 5, method 500 further comprises, at 506, preferentially skip firing the donor cylinders. For example, during engine cycle N, or the first engine cycle of the preferential skip fire routine, fuel is injected to a subset of the non-donor cylinders at 508, and to each donor cylinder at 510. Following completion of engine cycle N, every cylinder in the subset will have fired, and in engine cycle N+1, fuel is injected to a different subset of non-donor cylinders at 512 and each donor cylinder at 514. The subsets may be chosen based on fuel demand and EGR rate, and may be distributed in such a manner to equally balance cylinder firing across multiple engine cycles. At 516, method 500 comprises injecting fuel to a subset of non-donor cylinders during engine cycle i. Engine cycle i represents any number of an engine cycle within the preferential skip fire routine, and the cylinders in the subset of fired cylinders may be similar to the subset of engine cycle N, may be similar to the subset of engine cycle N+1, or may be a different subset, depending on the chosen distribution of cylinder firing across the engine cycles. Method 500 further comprises, at 518, injecting fuel to each donor cylinder in engine cycle i.

Performing method 500 to achieve a target EGR rate of 0.36, as described in the first example above, results in a skip fire protocol where one non-donor cylinder is skipped each engine cycle. If the engine comprises four donor cylinders and fires in the order described with respect to FIG. 2, a non-skip fire protocol would result in an engine firing order of 1-7-5D-11-3-9D-6-12-2D-8-4-10D where D indicates donor cylinder. An example of a preferential skip fire protocol where one cylinder is skipped each engine cycle is 7-5D-11-3-9D-6-12-2D-8-4-10D-1-5D-11-3-9D-6-12-2D-8-4-10D-1-7-5D-3-9D-6-12-2D-8-4-10D, etc. In this protocol, every eight engine cycles, each non-donor cylinder is fired seven times while each donor cylinder is fired eight times.

In a second example, if a target EGR rate of 0.525 is desired, a preferential skip fire protocol where four non-donor cylinders are skipped each engine cycle may be performed. An example skip fire protocol may be 7-5D-3-9D-12-2D-4-10D-1-5D-11-9D-6-2D-8-10D, where each non-donor cylinder is fired once every two engine cycles. Thus, in two engine cycles, each non-donor cylinder is fired once while each donor cylinder is fired twice. Further, the skip fire protocol equally balances thermal load across the cylinder banks. However, as a first engine cycle ends and a second engine cycle begins, the skip fire protocol described above will comprise uneven firing (three sequential fires with no intervening skips), which may result in uneven running of the engine. Thus, the chosen skip fire protocol may be selected in order to include even firing and thus even running of the engine.

The skip fire protocol where four non-donor cylinders are skipped each engine cycle results in an EGR rate of 0.5, with each fired cylinder receiving 12% of the total injected fuel, and thus contributing to 12% of the total $CO_2$ produced. To reach the target EGR rate of 0.525, fuel injection amounts to the donor cylinders may be increased. For example, if the donor cylinders each receive 13.1% of the injected fuel, and thus produce 1/7.62 of the total $CO_2$, and each fired non-donor cylinder receives 11.9% of the injected fuel, and thus produces 1/8.42 of the total $CO_2$, the EGR rate will be 0.525:

$$\frac{4\left(\frac{1}{7.62}x\right)}{4\left(\frac{1}{7.62}x\right) + 4\left(\frac{1}{8.42}x\right)} = \frac{0.525x}{0.525x + 0.475x} = 0.525$$

Thus, method 500 provides for preferentially skip firing donor cylinders and/or adjusting fuel injection amounts to reach a target effective EGR rate. By selecting a number of non-donor cylinders to skip, the relative proportion of combusted gasses in the intake can be controlled. In this way, NOx emissions may be controlled while increasing accuracy of fuel delivery.

Another embodiment relates to a method for controlling EGR rate in an internal combustion engine. The method comprises routing exhaust from a first cylinder group to an intake coupled to the engine, and not to atmosphere. The method further comprises routing exhaust from a second cylinder group to atmosphere. The method further comprises, during a first engine operating condition, injecting fuel to each cylinder in the first cylinder group while injecting fuel to a subset of cylinders of the second cylinder group. The first cylinder group comprises all cylinders of the engine whose exhausts (e.g., exhaust ports) are coupled to the engine intake and not to atmosphere. The second cylinder group comprises all cylinders of the engine whose exhausts are coupled to atmosphere.

An embodiment relates to an engine system. The engine system comprises an air intake, an exhaust, and an engine block. The engine block has a first cylinder group and a second cylinder group. Exhaust ports of the cylinders of the first cylinder group are fluidly coupled to the intake and not to the exhaust or otherwise to atmosphere. Exhaust ports of the cylinders of the second cylinder group are fluidly coupled to the exhaust. The engine system further comprises a fuel injection system operably coupled to the cylinders of the first cylinder group and the second cylinder group for controllably injecting fuel into the cylinders. The engine system further comprises a controller for controlling the fuel injection system. The controller is configured to control the fuel injection system, during a first engine operating condition, to inject fuel to each cylinder in the first cylinder group and concurrently inject fuel to a subset of cylinders of the second cylinder group.

An embodiment relates to an engine system. The engine system comprises an air intake, an exhaust, and an engine block. The engine block has a donor cylinder group and a non-donor cylinder group. Exhaust ports of the cylinders of the donor cylinder group are fluidly coupled to the intake and not to the exhaust or otherwise to atmosphere. Exhaust ports of the cylinders of the non-donor cylinder group are fluidly coupled to the exhaust. The engine system further comprises a fuel injection system operably coupled to the cylinders of the donor cylinder group and the non-donor cylinder group for controllably injecting fuel into the cylinders. The engine system further comprises a controller for controlling the fuel injection system. The controller is configured to determine a target EGR rate. The controller is further configured to control the fuel injection system to inject fuel to each cylinder of a donor cylinder group, and to inject fuel to a subset of cylinders of the non-donor cylinder group. The controller is further configured to adjust a number of cylinders of the subset of cylinders of the non-donor cylinder group (i.e., to change the number of cylinders of the non-donor cylinder group into which fuel is injected) to obtain the target EGR rate.

An embodiment relates to an engine system. The engine system comprises an air intake, an exhaust, and an engine block. The engine block has a donor cylinder group and a non-donor cylinder group. Exhaust ports of the cylinders of the donor cylinder group are fluidly coupled to the intake and not to the exhaust or otherwise to atmosphere. Exhaust ports of the cylinders of the non-donor cylinder group are fluidly coupled to the exhaust. The engine system further comprises a controller for controlling the engine system. The controller is configured to control firing of the cylinders such that during a plurality of engine cycles, each cylinder from the donor cylinder group is fired more often than each cylinder from the non-donor cylinder group.

Other embodiments relate to non-transitory computer readable storage media having one or more sets of instructions stored thereon, that when executed by a controller, cause the controller to perform one or more of the functions described herein. For example, in one embodiment, the instructions, when executed by a controller, may cause the controller to determine a target EGR rate, control a fuel injection system to inject fuel to each cylinder of a donor cylinder group and to inject fuel to a subset of cylinders of the non-donor cylinder group, and to control the fuel injection system for adjusting a number of cylinders of the subset of cylinders of the non-donor cylinder group to obtain the target EGR rate.

As described above, a first group of one or more cylinders provides exhaust gas that is directed through an EGR passage coupled between the first group of cylinders and an intake manifold to provide EGR while a second group of one or more cylinders provides substantially no exhaust gas to the EGR passage. In some examples of the above configuration, EGR rate may be controlled through operation of a valve that is located in the EGR passage. The valve position is controlled to vary a mass flow rate of EGR provided to the intake manifold.

According to embodiments of the disclosure, under some conditions, EGR composition is controlled in a manner other than by controlling EGR mass flow rate through adjustment/control of an EGR valve. This is because adjusting EGR mass flow rate can be less accurate or can have looser tolerances that result in greater NOx emissions.

Thus, in one embodiment, a method for controlling an engine includes injecting fuel to a subset of cylinders that includes less than all cylinders of a first cylinder group to obtain a target exhaust gas recirculation (EGR) rate. The first cylinder group provides exhaust gas through an EGR passage structure fluidly coupled between the first cylinder group and an intake passage structure. The method further includes injecting fuel to at least one cylinder of a second cylinder group. The second cylinder group provides substantially no exhaust gas through the EGR passage structure.

As described previously, operating with some cylinders completing a combustion cycle without combusting is referred to herein as "skip firing." By skip firing cylinders in the cylinder group that provides EGR while injecting fuel to at least one cylinder of the other cylinder group, EGR is adjusted to meet the target EGR rate while achieving tighter tolerances on NOx and particulate matter (PM) emissions relative to controlling an EGR mass flow rate, for example. Moreover, by controlling EGR through skip firing of the cylinders that provide EGR, any valves or other control elements downstream of those cylinders for controlling the flow of EGR can be eliminated from the engine. In this way, the production cost of the engine is reduced. Further still, preferentially skip firing cylinders that provide EGR over cylinders that provide substantially no EGR facilitates the reduction of EGR to low levels that are favorable under some operating conditions.

Various embodiments of systems and methods are described below for controlling exhaust gas recirculation (EGR) in an engine having different groups of cylinders that selectively provide EGR. More particularly, the present description relates to preferentially skip firing cylinders that provide EGR over cylinders that provide substantially no exhaust gas to an EGR passage structure in order to reduce EGR under various conditions. Furthermore, in one example, a fuel injection amount of the cylinders that provide EGR is adjusted to vary the EGR rate with a higher granularity from substantially no EGR to a full capability of the cylinders that provide EGR.

In some embodiments, the engine is configured to be positioned in a vehicle, such as a rail vehicle, such as the vehicle system 100 described above with respect to FIG. 1. The described methods and configurations may be particularly advantageous in certain types of vehicles that undergo sustained periods of low load operation, for example sitting at idle mode during loading and unloading of cargo, idling in the yard, or other idle operation. In one example, "low-load" operation comprises a mode of operation of the engine where a relatively low amount of work is performed by the engine, for example, low-load operation is less than 50% of maximum engine load. Conversely, a "high-load" operation of the engine comprises a mode of operation where a relatively higher amount of work is performed by the engine, for example operation at greater than 50% maximum engine load.

In some embodiments, the system and methods for controlling the EGR rate by skip firing the cylinders that provide EGR is employed to de-rate engine output during some conditions. For example, this approach is particularly applicable to tunnel operation. Specifically, during tunnel operation (referring to a vehicle traveling through a tunnel), the ambient temperature in the tunnel is increased due to the inherent trapping of exhaust gas expelled from the engine in the confines of the tunnel. Thus, the performance of a rail vehicle (e.g., rate at which the rail vehicle travels through the tunnel) can be increased by skip firing one or more cylinders that provide EGR to increase the air/fuel ratio and reduce the need to de-rate the engine. Moreover, combustion temperatures, heat rejected to the tunnel, and the heat load of the EGR cooler is reduced.

Figure 6:
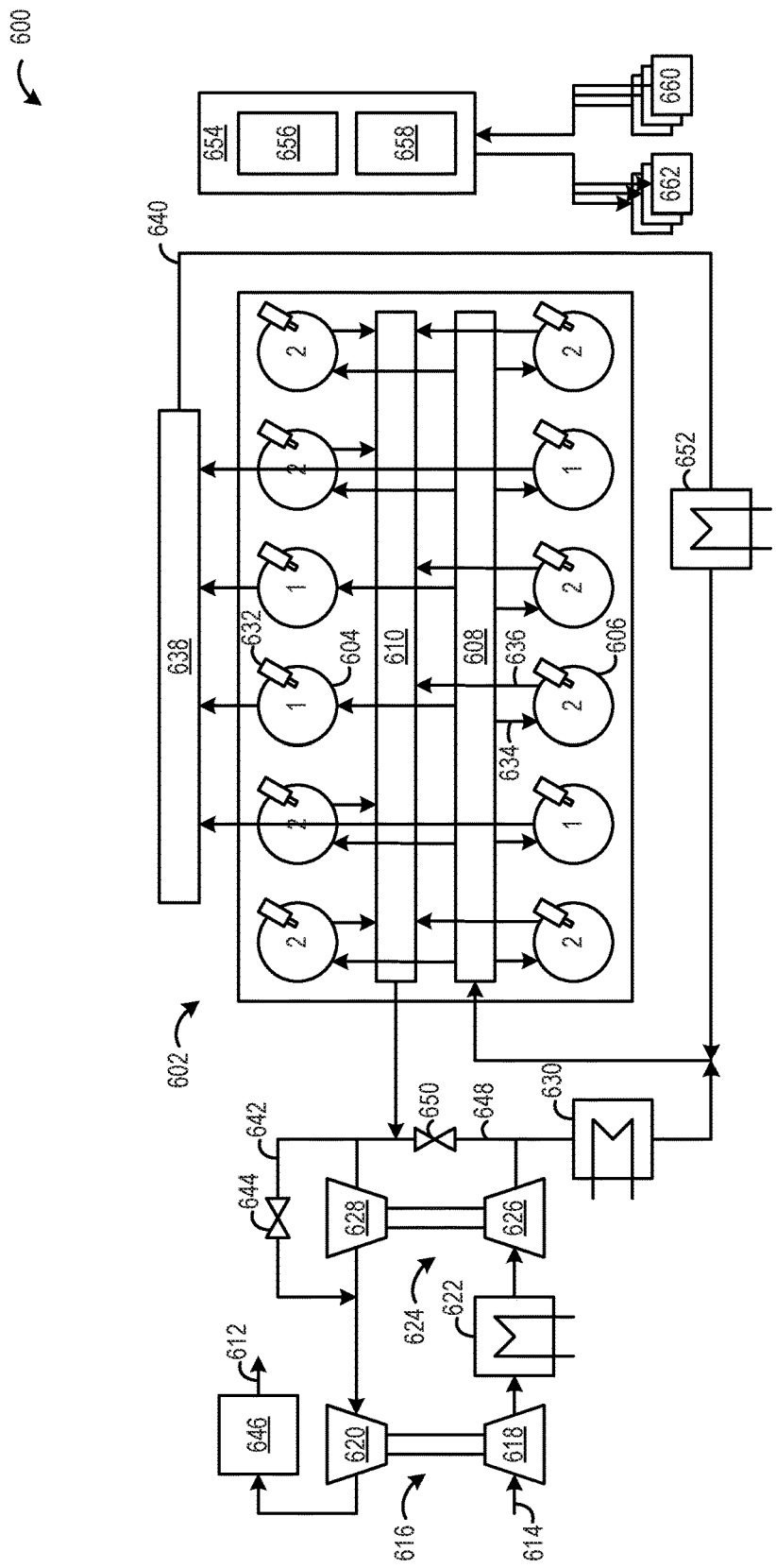
FIG. 6 shows a schematic diagram of an engine according to an embodiment of the present disclosure.

FIG. 6 schematically shows an embodiment of an engine system 600 including a plurality of cylinders 602. The plurality of cylinders 602 is organized into a first cylinder group 604 and a second cylinder group 606. Note that "first" and "second" are labels to denote the cylinders of the first and second cylinder groups, respectively. In one example, the engine system 600 is implemented in a vehicle, such as the vehicle system 100 shown in FIG. 1.

The first cylinder group 604 provides exhaust gas that is directed to an intake manifold 608 of the engine system 600. The intake manifold refers to a passage structure or passages that link to cylinder input ports for providing intake air to the cylinders. In the illustrated embodiment, the first cylinder group 604 provides exhaust gas exclusively to the intake manifold 608. In other words, the first cylinder group 604 is not coupled to an exhaust manifold 610, and further is not directly fluidly coupled to an exhaust passage structure 612 that expels exhaust gas to the atmosphere.

The second cylinder group 606 is coupled to the exhaust manifold 610. Under some conditions, the second cylinder group 606 provides exhaust gas that is directed through the exhaust passage structure 612 and expelled to the atmosphere. Under some conditions, the second cylinder group 606 provides exhaust gas that is directed through a bypass passage structure 648 to the intake manifold 608. In other words, in the illustrated embodiment, the first cylinder group provides exhaust gas merely for EGR and the second cylinder group selectively provides exhaust gas for EGR or to be expelled to the atmosphere. In some embodiments, the first cylinder group is exclusive of the second cylinder group. "Exclusive" means that no cylinder of the first cylinder group is included in the second cylinder group. In the illustrated embodiment, the engine is a V-12 engine having twelve cylinders. In other examples, the engine is a V-6, V-8, V-10, V-16, I-4, I-6, I-8, opposed 4, or another engine type. It will be appreciated that each of the cylinder groups includes a suitable number of cylinders. Furthermore, the engine system includes a suitable number of cylinder groups.

The intake manifold 608 couples to the first cylinder group 604 and the second cylinder group 606. An intake passage structure 614 is coupled to the intake manifold 608 to supply fresh air to the intake manifold 608 for combustion. A staged or series turbocharger setup including a first turbocharger 616 and a second turbocharger 624 is positioned in the intake passage structure 614 to compress intake air. The first turbocharger 616 includes a first compressor 618 positioned in the intake passage structure 614 and a first turbine 620 positioned in the exhaust passage structure 612. The first turbine 620 is driven at least partially by exhaust gas provided by the second cylinder group 606 through the exhaust manifold 610. A first liquid-cooled charge air cooler 622 is positioned in the intake passage structure 614 downstream of the first compressor 618. The second turbocharger 624 includes a second compressor 626 positioned in the intake passage structure 614 downstream of the first cooler 622 and a second turbine 628 positioned in the exhaust passage structure 612 upstream of the first turbine 620. The second turbine 628 is driven at least partially by exhaust gas provided by the second cylinder group 606 through the exhaust manifold 610. A second liquid-cooled charge air cooler 630 is positioned in the intake passage structure 614 downstream of the second compressor 626.

In the illustrated implementation, the engine system 600 does not include a throttle valve positioned in the intake passage structure 614. However, in some implementations, the intake passage structure 614 includes a throttle valve positioned downstream of the second compressor 626.

Each of the plurality of cylinders 602 includes a fuel injector 632 operable to inject fuel into that cylinder, at least one intake port 634 that is operable to receive combustion air from the intake manifold 608, and at least one exhaust port 636 that is operable to exhaust gas to an exhaust manifold. An exhaust manifold (a.k.a., an EGR manifold) 638 is coupled to the first cylinder group 604 to receive exhaust gas from the first cylinder group. In the illustrated embodiment, the EGR manifold 638 is not coupled to the second cylinder group 606. An EGR passage structure 640 is coupled between the EGR manifold 638 and the intake passage structure 614. Under some conditions, exhaust gas provided by the first cylinder group 604 flows through the EGR passage structure 640 into the intake passage structure 614, where it mixes with fresh intake air and the mixture is provided to the plurality of cylinders 602 through the intake manifold 608 for combustion. In the illustrated embodiment, the EGR passage structure 640 is not coupled to the exhaust manifold 610. A liquid-cooled EGR cooler 652 is positioned in the EGR passage structure 640 to cool exhaust gas before the exhaust gas is circulated to the intake manifold 608.

In the illustrated embodiment, the EGR passage structure 640 does not include a control device operable to control flow of exhaust gas to the intake passage structure. In other words, there are no valves or other control elements positioned downstream of the first cylinder group for controlling the flow of EGR. However, it will be appreciated that in some embodiments, the EGR passage structure includes one or more valves for controlling the flow of exhaust gas provided by the first cylinder group.

The exhaust manifold 610 is coupled to the second cylinder group 606 to receive exhaust gas from the second cylinder group. In the illustrated embodiment, the exhaust manifold 610 is not coupled to the first cylinder group 604. Under some conditions, exhaust gas provided by the second cylinder group 606 travels from the exhaust manifold 610, through the second turbine 628 of the second turbocharger 624, through the first turbine 620 of the first turbocharger 616 to be expelled from the exhaust passage structure 612 into the atmosphere. Under some conditions, the exhaust gas bypasses the second turbine 628 through an exhaust bypass passage structure 642. An exhaust bypass valve 644 is positioned in the exhaust bypass passage structure 642. The exhaust bypass valve 644 is operable to control flow of exhaust gas through the exhaust bypass passage structure 642. For example, the bypass valve 644 is adjusted to bypass the second turbine 628 to lower boost pressure under some conditions.

An exhaust gas treatment system 646 is provided in the exhaust passage structure 612, downstream of the first turbine 620. The exhaust gas treatment system 646 treats exhaust gas before it is released to the atmosphere. For example, the exhaust gas treatment system includes a selective catalytic reduction (SCR) system, a diesel oxidation catalyst (DOC), a diesel particulate filter (DPF), various other emission control devices, or combinations thereof.

A bypass passage structure 648 is coupled between the exhaust passage structure 612 and the intake passage structure 614. More particularly, the bypass passage structure 648 is positioned between a point in the exhaust passage structure 612 upstream of the second turbine 628 and downstream of the exhaust manifold 610 and a point in the intake passage structure 614 downstream of the second compressor 626 and upstream of the second cooler 630. Under some conditions, exhaust gas provided by the second cylinder group flows from the exhaust passage structure 612, through the bypass passage structure 648, to the intake passage structure 614 to provide EGR to the plurality of cylinders 602. Furthermore, under some conditions, intake air flows from the intake passage structure 614, through the bypass passage structure 648, and to the exhaust passage structure 612 to accelerate the turbines of the turbochargers. A bypass valve 650 is positioned in the bypass passage structure to control flow of exhaust gas or intake air through the bypass passage structure 648.

A controller 654 includes a processor 656 and computer-readable medium 658 having non-transient instructions that when executed by the processor 656 execute control routines to control the engine 600 and more particularly control EGR during various operating conditions. The controller 654 receives signals from a variety of engine sensors 660 in order to determine operating parameters and operating conditions, and correspondingly adjusts various engine actuators 662.

In one embodiment, the controller 654 is operable to determine a target EGR rate. In one example, the target EGR rate is determined based on one or more of engine load, engine speed, combustion stability, particulate matter concentration, intake manifold oxygen concentration, or NOx emissions. Further, the controller 654 is operable to control injection of fuel to a subset of cylinders that includes less than all cylinders of the first cylinder group to obtain the target EGR rate, and to control injection of fuel to each cylinder of the second cylinder group. In other words, the controller is configured to control skip firing of the cylinder group that provides exhaust gas to the EGR passage structure and to control fueling of each cylinder of the other cylinder group that does not provide exhaust gas to the EGR passage structure. In some embodiments, the controller controls fuel injection such that fuel is injected to only the subset of cylinders, and substantially no fuel is injected into members of the first cylinder group that are not in the subset. By skip firing or shutting off the fuel to one or more cylinders that comprise the subset of the first cylinder group, the amount of exhaust produced by the non-firing cylinders is reduced to zero, thus reducing the total amount of exhaust gas recirculated to the intake manifold.

For example, during skip-fire operation, in one combustion cycle, at least one but fewer than all the cylinders of the first cylinder group are fired while every cylinder from the second cylinder group is fired. In this manner, across multiple engine cycles, the cylinders of the second cylinder group fires more often than the cylinders of first cylinder group. In some embodiments, the subset is varied so that each cylinder of the first cylinder group fires at some point over multiple combustion cycles. Under some conditions, all cylinders of the first cylinder group are skip-fired in order to reduce the EGR provided by the first cylinder group to substantially zero. In some embodiments, different cylinders are skip fired or partially fueled during different combustion cycles. For example, a cylinder designated for skip firing may be rotated around after each combustion cycle, or some number of combustion cycles.

Furthermore, the amount of EGR could be further reduced if the fueling were shut off every other cycle. Even finer adjustment of the EGR rate may be attained by skip firing the donor cylinders every 3rd or 4th cycles, etc. In one example, the controller 654 is operable to control injection of fuel to the subset of cylinders of the first cylinder group during a first combustion cycle and to control injection of fuel to each cylinder of the first cylinder group during a second combustion cycle to obtain the target EGR rate. In one example, at least one combustion cycle separates the first combustion cycle and the second engine cycle. In other words, the controller varies the number of combustion cycles between skip fire events in order to obtain the target EGR rate. Such an approach provides more granular adjustment than controlling EGR flow rate through an EGR valve.

In one embodiment, the controller 654 is operable to adjust a fuel injection amount to at least one cylinder of the subset of cylinders of the first cylinder group to obtain the target EGR rate. For example, if less fuel is burned in the active cylinders that are not skip fired in the first cylinder group, the amount of exhaust gasses produced by the first cylinder group are reduced, providing an overall reduction in EGR rate. The combination of skip firing and adjusting fuel injection to the active cylinders of the first cylinder group facilitate variable EGR rate control with very high granularity relative to controlling EGR through EGR flow control.

Moreover, aside from the challenging controls and the adverse environment in which an EGR valve operates, a further complication of the EGR flow control approach is that it shifts an operating point of the turbochargers towards a choke condition. In other words, if all of the exhaust of the donating cylinders is combined with the exhaust of the non-donating cylinders, the turbocharger would need to be approximately 50% larger in order to handle the combined flow. As such, the turbocharger would be sub-optimized under various operating conditions in order to accommodate the large range of exhaust flow. By varying the EGR rate with skip fire and/or reduced fueling of the donor cylinders, the exhaust flow to the turbocharger could be held relatively constant, thus enabling optimized (or at least improved) performance of the turbochargers over a very broad operating range.

In one embodiment, the controller 654 is operable to adjust a fuel injection amount to at least one cylinder of the second cylinder group dependent upon the first cylinder fuel injection adjustment to attain or maintain a target torque output provided by the first cylinder group and the second cylinder group. In some embodiments, the fuel injection amount of the second cylinder group is adjusted to attain or maintain an operating parameter other than torque output.

Furthermore, in another embodiment, the controller 654 is additionally or alternatively operable responsive to a tunnel condition. More specifically, the controller is configured, during a tunnel condition, to determine a second EGR rate that has a higher oxygen concentration than the target EGR rate, and to control injection of fuel to less than all cylinders of the subset of cylinders of the first cylinder group to obtain the second EGR rate. Furthermore, in another embodiment, the controller 654 is additionally or alternatively operable, in response to the tunnel condition, to determine a target power level, and to control injection of fuel to less than all cylinders of the subset of cylinders of the first cylinder group to obtain the target power level. By skip firing one or more cylinders that provide EGR, overall power output of the engine can be reduced, with the added benefit of increasing the combustion air/fuel ratio and reducing the heat rejected to the EGR cooler.

Furthermore, in another embodiment, the controller 654 is additionally or alternatively operable responsive to an ambient temperature being greater than a temperature threshold value or an ambient air pressure being less than a pressure threshold value. More specifically, during such a condition, the controller is configured to determine a second EGR rate that has a higher oxygen concentration than the target EGR rate, and to control injection of fuel to less than all cylinders of the subset of cylinders of the first cylinder group to obtain the second EGR rate. By skip firing more cylinders that provide EGR during adverse ambient conditions (e.g., high temperature or low density air), the heat load on the EGR cooler is reduced.

Figure 7:
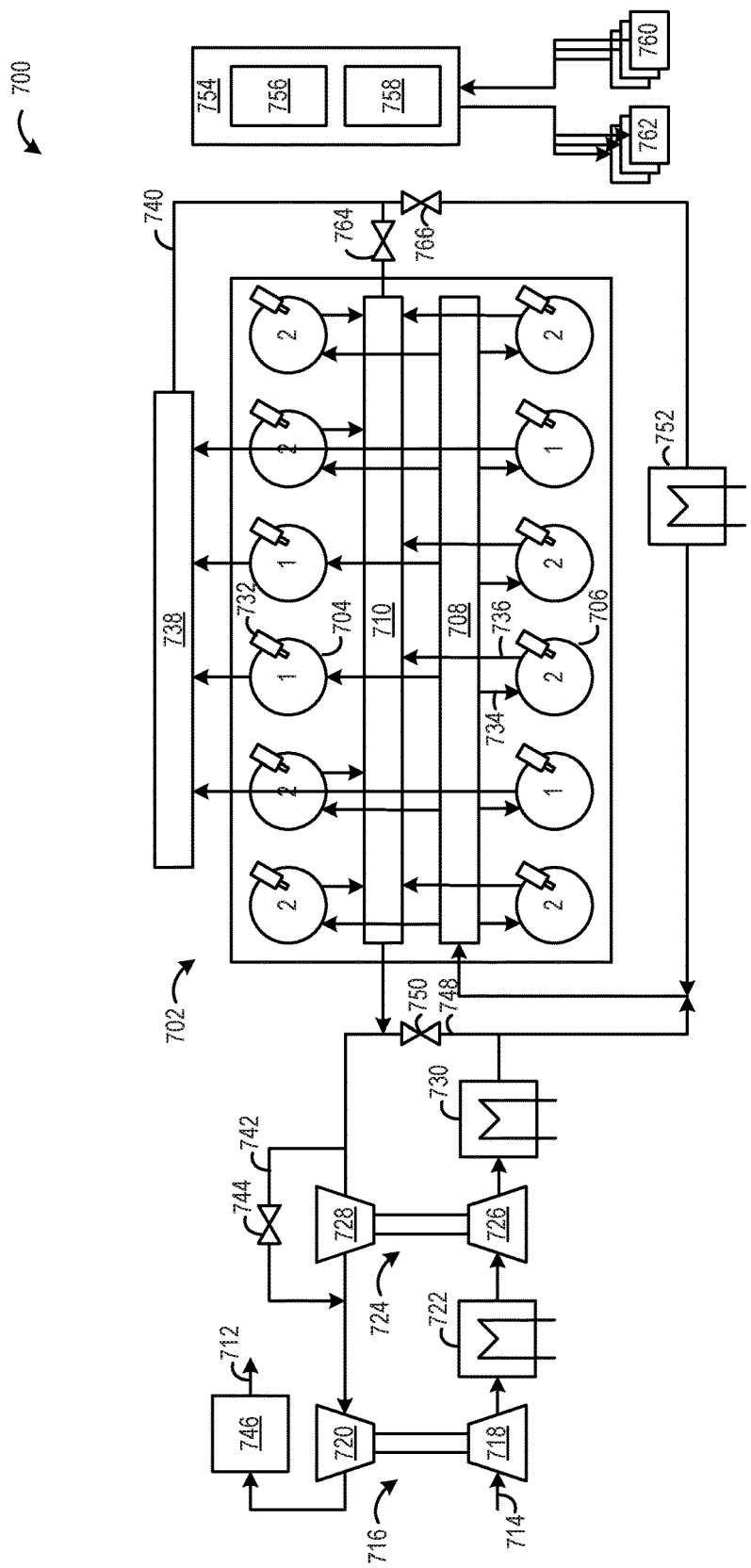
FIG. 7 shows a schematic diagram of another engine according to an embodiment of the present disclosure.

FIG. 7 schematically shows another embodiment of an engine system 700. Components of the engine system 700 that are substantially the same as those of the engine system 600 are identified in the same way and are described no further. However, it will be noted that components identified in the same way in different embodiments of the present disclosure can be at least partly different.

The engine system 700 includes additional valves in the EGR passage structure that allow the first cylinder group and/or the second cylinder group to selectively provide exhaust gas to the intake manifold and/or the exhaust manifold. In other words, in the illustrated embodiment, the first cylinder group can provide exhaust gas for EGR and/or to the exhaust passage structure. In particular, the EGR passage structure 740 is selectively fluidly coupled to the exhaust manifold 710. An EGR bypass valve 764 is positioned in the EGR passage structure 740. The EGR bypass valve 764 is operable to control the flow of exhaust gas from the first cylinder group 704 through the EGR passage structure 740 to the exhaust manifold 710 and/or the exhaust passage structure 712.

An EGR flow valve 766 is positioned in the EGR passage structure 740 between EGR manifold 738 and the EGR cooler 752. The EGR flow valve 766 is operable to control EGR flow through the EGR passage structure to the EGR cooler 752. The EGR bypass valve 764 and the EGR flow valve 766 are cooperatively controlled by the controller 754 to direct exhaust gas flow from the first cylinder group 704 based on operating conditions.

In the illustrated embodiment, the bypass passage structure 748 is positioned downstream of the second cooler 730. As such, hot exhaust gas is passed through the bypass passage to the intake passage without being cooled by the second cooler. By not cooling the exhaust gas with the second cooler, the exhaust gas heats the cylinder more quickly relative to EGR that is cooled by the second cooler. Although it will be appreciated that in some embodiments the bypass passage structure is positioned upstream of the second cooler.

In one embodiment, the controller 754 is operable to close the EGR bypass valve 764, open the EGR flow valve 766, control fuel injection to a subset of cylinders that includes less than all cylinder of the first cylinder group to obtain a target EGR rate, and control fuel injection to each cylinder of the second cylinder group. In other words, the controller controls skip firing of the cylinder group that provides exhaust gas to the EGR passage structure and controls fueling of cylinders of the other cylinder group that does not provide exhaust gas to the EGR passage structure. By skip firing or shutting off the fuel to one or more cylinders that comprise the subset of the first cylinder group, the amount of exhaust produced by the non-firing cylinders is reduced to zero, thus reducing the total amount of exhaust gas recirculated to the intake manifold.

Furthermore, in another embodiment, the controller 754 is operable to adjust an opening position of the EGR bypass valve and an opening position of the EGR flow valve to control a flow of exhaust gas provided to the EGR passage to obtain the target EGR rate.

Figure 8:
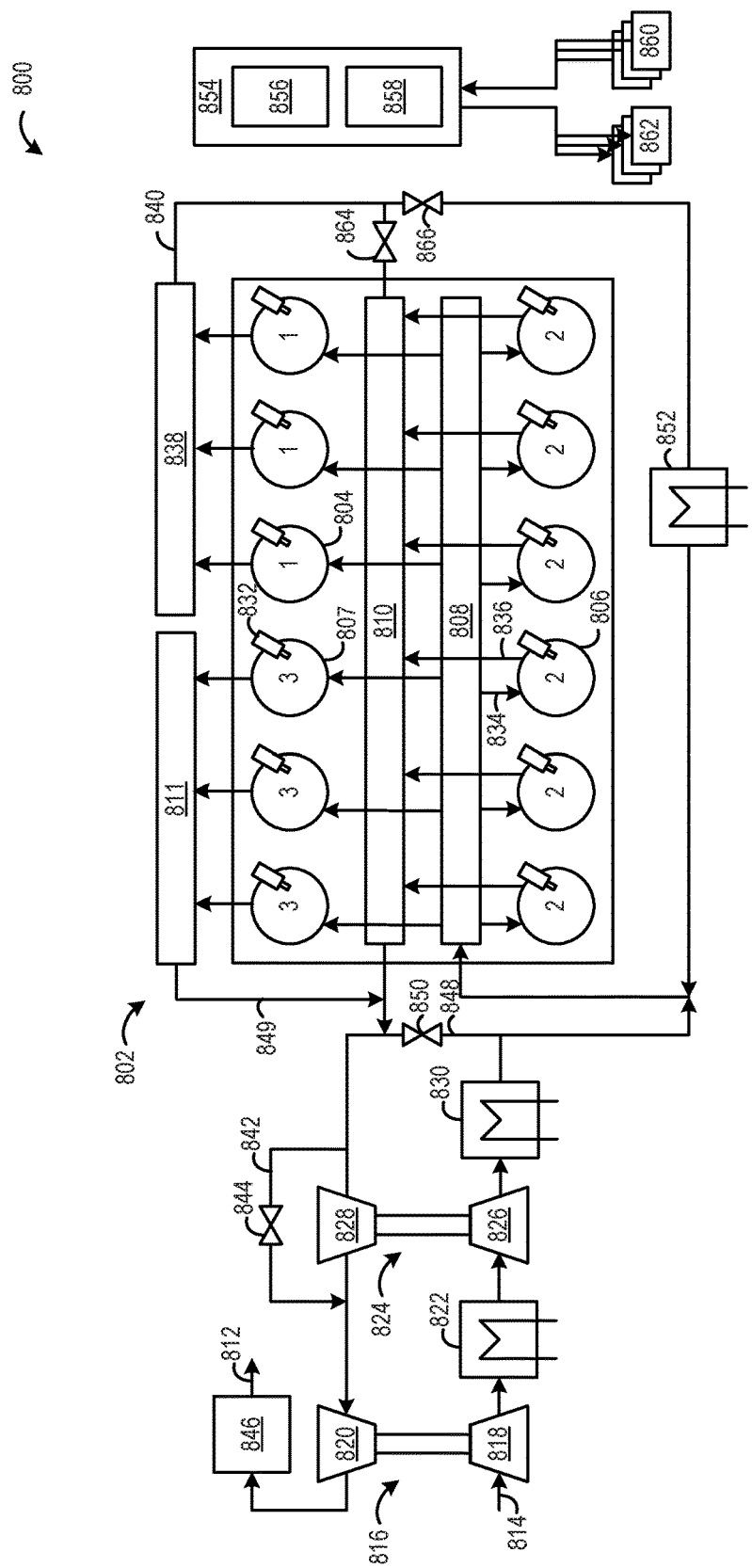
FIG. 8 shows a schematic diagram of another engine according to an embodiment of the present disclosure.

FIG. 8 schematically shows another embodiment of an engine system 800. Components of the engine system 800 that are substantially the same as those of the engine system 600 and/or 700 are identified in the same way and are described no further. However, it will be noted that components identified in the same way in different embodiments of the present disclosure can be at least partly different.

The engine system 800 includes a plurality of cylinders 802. The plurality of cylinders 802 is organized into a first cylinder group 804 and at least one additional cylinder group. As shown, the at least one additional cylinder group includes a second cylinder group 806 and a third cylinder group 807. Note that "first," "second," and "third" are labels to denote the cylinders of the first, second, and third cylinder groups, respectively. In one example, the engine system 800 is implemented in a vehicle, such as the vehicle system 100 shown in FIG. 1.

The engine system 800 includes an intake manifold 808, a first exhaust manifold 838, and at least one additional exhaust manifold. As shown, the at least one additional exhaust manifold includes a second exhaust manifold 810 and a third exhaust manifold 811. The first cylinder group 804 provides exhaust gas that may be directed to the intake manifold 808 of the engine system 800. The second cylinder group 806 provides exhaust gas that is directed to the second exhaust manifold 810. The third cylinder group 807 provides exhaust gas that is directed to the third exhaust manifold 811.

The engine system 800 includes the additional valves in the EGR passage structure described above with respect to FIG. 7 to selectively provide exhaust gas to the intake manifold and/or the exhaust manifold. In the illustrated embodiment, the first cylinder group can provide exhaust gas for EGR and/or to the exhaust passage structure. In particular, the EGR passage structure 840 is selectively fluidly coupled to the second exhaust manifold 810. An EGR bypass valve 864 is positioned in the EGR passage structure 840. The EGR bypass valve 864 is operable to control the flow of exhaust gas from the first cylinder group 804 through the EGR passage structure 840 to the second exhaust manifold 810 and/or the exhaust passage structure 812.

An EGR flow valve 866 is positioned in the EGR passage structure 840 between EGR manifold 838 and the EGR cooler 852. The EGR flow valve 866 is operable to control EGR flow through the EGR passage structure to the EGR cooler 852. The EGR bypass valve 864 and the EGR flow valve 866 are cooperatively controlled by the controller 854 to direct exhaust gas flow from the first cylinder group 804 based on operating conditions.

In the illustrated embodiment, the bypass passage structure 848 is positioned downstream of the second cooler 830. As such, hot exhaust gas is passed through the bypass passage to the intake passage without being cooled by the second cooler. By not cooling the exhaust gas with the second cooler, the exhaust gas heats the cylinder more quickly relative to EGR that is cooled by the second cooler. Although it will be appreciated that in some embodiments the bypass passage structure is positioned upstream of the second cooler. It will further be appreciated that in some embodiments, the bypass passage structure 848 and bypass valve 850 may be dispensed with, and all exhaust from second exhaust manifold 810 is provided exclusively to the exhaust passage structure 812.

As illustrated, third exhaust manifold 811 provides exhaust gas to exhaust passage structure 812 via passage 849. Third exhaust manifold 811 and first exhaust manifold 838 are on a single cylinder bank of the engine, while second exhaust manifold 810 is on another cylinder bank of the engine. Additionally, as illustrated, the first cylinder group includes three cylinders, the second cylinder group includes six cylinders, and the third cylinder group includes three cylinders. However, it will appreciated that more or fewer cylinders could be included in each cylinder group. For example, the first cylinder group may comprise six cylinders, and the second and third cylinder groups may each comprise three cylinders. In other examples, the second and third exhaust manifolds may be on a single cylinder bank of the engine, and the first exhaust manifold may be on another cylinder bank of the engine. In such examples, the first exhaust manifold may be configured to discharge exhaust gas to the intake manifold and one or more of the second exhaust manifold and third exhaust manifold. Further still, one or more of the first exhaust manifold, second exhaust manifold, and third exhaust manifold may receive exhaust from cylinders of each cylinder bank.

In one embodiment, the controller 854 is operable to close the EGR bypass valve 864, open the EGR flow valve 866, control fuel injection to a subset of cylinders that includes less than all cylinders of the first cylinder group to obtain a target EGR rate, and control fuel injection to each cylinder of the second cylinder group and each cylinder of the third cylinder group. In other words, the controller controls skip firing of the cylinder group that provides exhaust gas to the EGR passage structure and controls fueling of cylinders of the other cylinder group(s) that do not provide exhaust gas to the EGR passage structure. By skip firing or shutting off the fuel to one or more cylinders that comprise the subset of the first cylinder group, the amount of exhaust produced by the non-firing cylinders is reduced to zero, thus reducing the total amount of exhaust gas recirculated to the intake manifold.

In another example, the controller 854 is operable to not inject fuel to each of a subset of cylinders in the first cylinder group while injecting fuel to a subset of all cylinders coupled to the at least one additional exhaust manifold. In this way, both the cylinders that are configured to supply exhaust to the EGR passage and cylinders that are not configured to supply exhaust to the EGR passage may be skip fired, in order to increase engine efficiency during low load conditions. In such examples, the number of cylinders of the subset of cylinders in the first cylinder group decreases in response to an increase in a target EGR rate.

Furthermore, in another embodiment, the controller 854 is operable to adjust an opening position of the EGR bypass valve and an opening position of the EGR flow valve to control a flow of exhaust gas provided to the EGR passage to obtain the target EGR rate.

Figure 9:
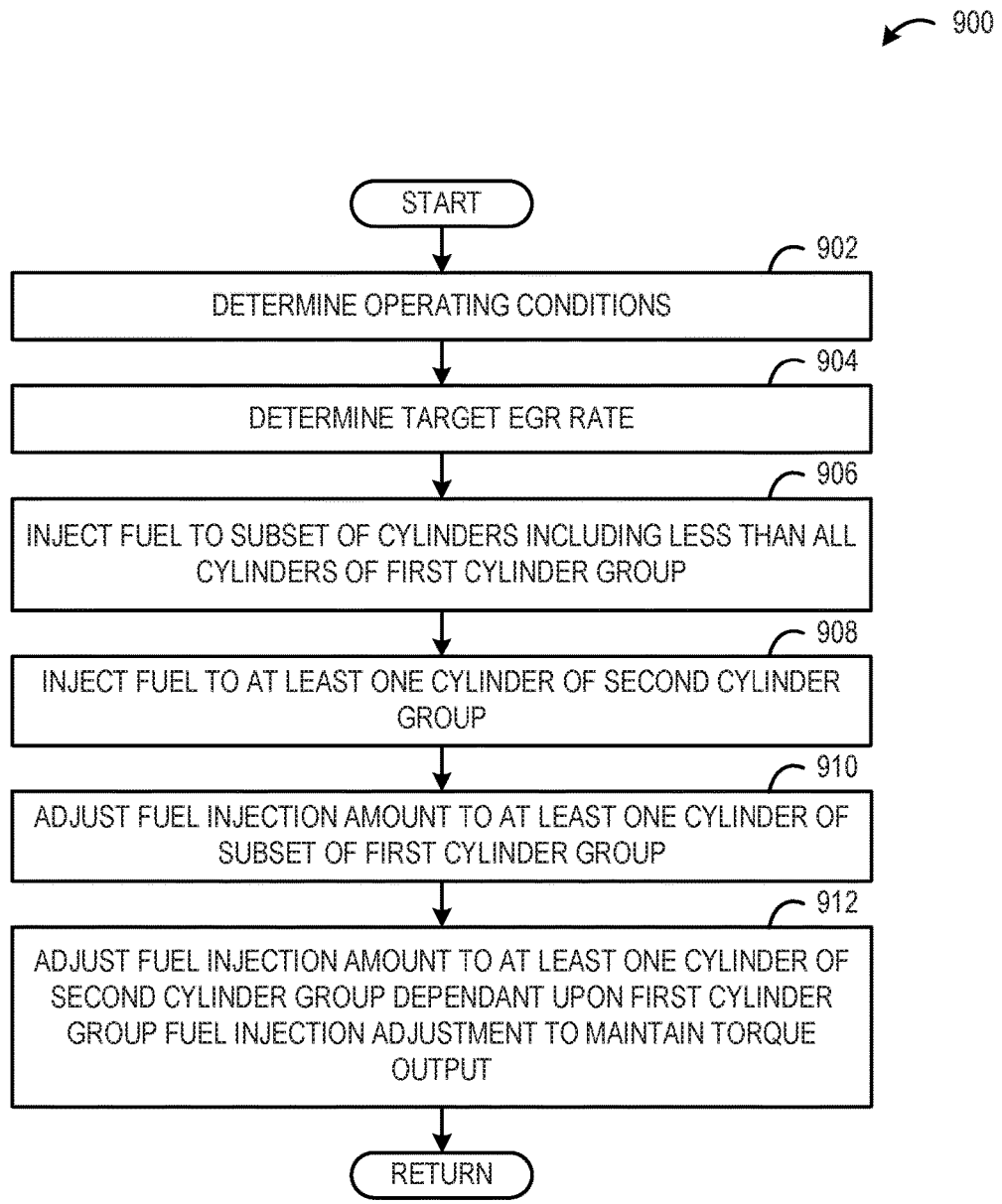
FIG. 9 shows a flow chart of an embodiment of a method for controlling EGR in an engine by skip firing cylinders that provide EGR.

FIG. 9 shows a flow chart of an embodiment of a method 900 for controlling EGR in an engine. In one embodiment, the method 900 is executed by the controller 112 in FIG. 1, or the controller 654 in FIG. 6, the controller 754 in FIG. 7, or the controller 854 in FIG. 8. At 902, the method 900 includes determining operating conditions. For example, operating conditions may be determined based on operating parameters indicative of sensor signals received from sensors coupled to the engine, such as intake pressure, exhaust pressure, engine temperature, ambient temperature, air-fuel ratio, engine speed, engine load, exhaust temperature, exhaust pressure, ambient pressure, ambient altitude, etc.

At 904, the method 900 includes determining a target EGR rate. In one embodiment, the target EGR rate is determined based on one or more of engine load, engine speed, combustion stability, particulate matter concentration, intake manifold oxygen concentration, or NOx emissions.

At 906, the method 900 includes injecting fuel to a subset of cylinders that includes less than all cylinders of a first cylinder group to obtain the target EGR rate. In one embodiment, the method includes injection fuel to only cylinders in the subset of the first cylinder group and no fuel is injected to members of the first cylinder group that are not in the subset. In one embodiment, the first cylinder group provides exhaust gas through an EGR passage fluidly coupled between the first cylinder group and an intake passage. For example, the subset of cylinders receiving fuel is increased as the target EGR rate increases and the subset of cylinders receiving fuel is decreased as the target EGR decreases. For example, injecting fuel to the subset of cylinders of the first cylinder group can be performed every combustion cycle, every other combustion cycle, every 3rd or 4th combustion cycle, etc. over a designated number of combustion cycles to obtain the target EGR rate.

At 908, the method 900 includes injecting fuel to at least one cylinder of a second cylinder group. The second cylinder group provides substantially no exhaust gas through the EGR passage. For example, the second cylinder group provides exhaust to an exhaust passage that fluidly couples to the atmosphere instead of providing exhaust gas to the EGR passage. It will be appreciated that a number of cylinders of the first cylinder group are fueled/fired less often than a number of cylinders of the second cylinder group over a designated number of combustion cycles. In one embodiment, the method 900 includes injection fuel to each cylinder of the second cylinder group.

At 910, the method 900 includes adjusting a fuel injection amount to at least one cylinder of the subset of cylinders of the first cylinder group to obtain the target EGR rate.

At 912, the method 900 includes adjusting a fuel injection amount to at least one cylinder of the second cylinder group dependent upon the first cylinder group fuel injection adjustment to attain or maintain a target torque output provided by the first cylinder group and the second cylinder group. For example, if the fuel injection amount of one or more cylinders of the subset of the first cylinder group is decreased to obtain the target EGR rate, then a fuel injection amount of one or more cylinder of the second cylinder group is increased by a corresponding amount.

By skip firing cylinders that provide EGR while fueling cylinders that provide substantially no EGR, more accurate and less complicated EGR control is achieved relative to an approach that employs EGR valves in the EGR passage. Accordingly, such valve that would otherwise be necessary to direct some of the EGR gasses into the non-EGR gas stream can be potentially eliminated from the engine. Moreover, by eliminating valves from the EGR passage, the turbocharger can be suitably matched to an exhaust flow of a fixed number of cylinders, thus minimizing a map width of the turbocharger and correspondingly more efficient operation over a broader range of operating conditions. In other words, by varying the EGR rate with skip fire or reduced fueling of the cylinders that provide EGR, the exhaust flow to the turbocharger could be held relatively constant, thus enabling optimized performance of the turbochargers over a very broad operating range.

Figure 10:
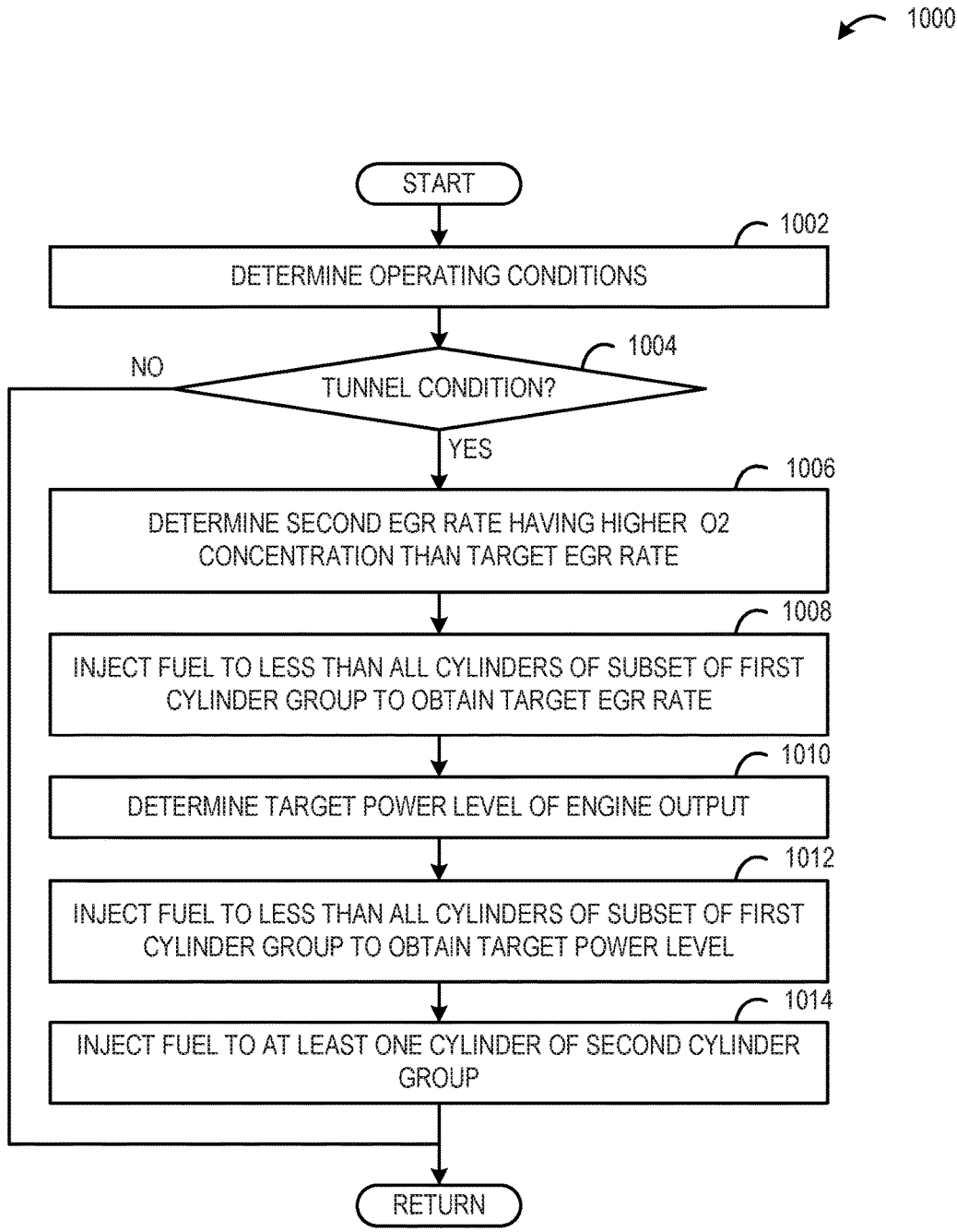
FIG. 10 shows a flow chart of another embodiment of a method for controlling EGR in an engine by skip firing during a tunnel condition.

FIG. 10 shows a flow chart of an embodiment of a method 1000 for controlling EGR in an engine during a tunnel condition. In one embodiment, the method 1000 is executed by the controller 112 in FIG. 1, the controller 654 in FIG. 6, the controller 754 in FIG. 7, or the controller 854 in FIG. 8. At 1002, the method 1000 includes determining operating conditions. The method 1000 is executed alone or in combination with the method 900 shown in FIG. 9.

At 1004, the method 1000 includes determining whether there is a tunnel condition. For example, the tunnel condition includes a locomotive or other vehicle entering or operating in a tunnel. In one embodiment, a tunnel condition is determined based on GPS information and/or route-feature information. In another embodiment, the tunnel condition is determined based on ambient temperature and intake manifold oxygen concentration. If it is determined that there is a tunnel condition, then the method 1000 moves to 1006. Otherwise, the method 1000 returns to other operations.

At 1006, the method 1000 includes determining a second EGR rate that has a higher oxygen concentration than the target EGR rate. For example, the target EGR rate is determined based on operation outside of the tunnel. The second EGR rate has a higher oxygen concentration than the target EGR rate due to the reduced fresh air inducted during operation in the tunnel due to expelled exhaust gas being trapped in the tunnel. Moreover, the second EGR rate is increased relative to the target EGR rate due to the reduced heat rejection capability of the locomotive and resultant increased fluid temperatures (e.g., oil, water, air) that occurred during tunnel operation.

At 1008, the method 1000 includes injecting fuel to less than all cylinders of the subset of cylinders of the first cylinder group to obtain the second EGR rate. In one embodiment, the method includes injecting fuel to only cylinders in the subset of the first cylinder group and no fuel is injected to members of the first cylinder group that are not in the subset. In other words, the number of cylinders in the subset that are fueled is decreased in order to further reduce the EGR and increase the amount of intake air that is provided to the cylinder to achieve the second EGR rate. In one embodiment, all cylinders of the first cylinder group are skip fired to reduce the EGR rate to the second EGR rate.

At 1010, the method 1000 includes determining a target power level output by the engine. For example, the engine is de-rated to obtain the target power level. In one example, the target power level is determined based on one or more of engine coolant temperature, oil temperature, combustion stability, air/fuel ratio, etc.

At 1012, the method 1000 includes injecting fuel to less than all cylinders of the subset of cylinders of the first cylinder group to obtain the target power level.

At 1014, the method 1000 includes injecting fuel to at least one cylinder of the second cylinder group. In one embodiment, the method includes injecting fuel to each cylinder of the second cylinder group.

By skip firing the cylinders that provide EGR to control the EGR rate and de-rate the engine, the performance of the vehicle (e.g., a rate at which the vehicle travels thru the tunnel) can be increased. Moreover, heat rejected to the tunnel is reduced by reducing the heat load of the EGR cooling system, as well as lowering the exhaust temperature due to decreased EGR and/or increased air/fuel ratio.

Figure 11:
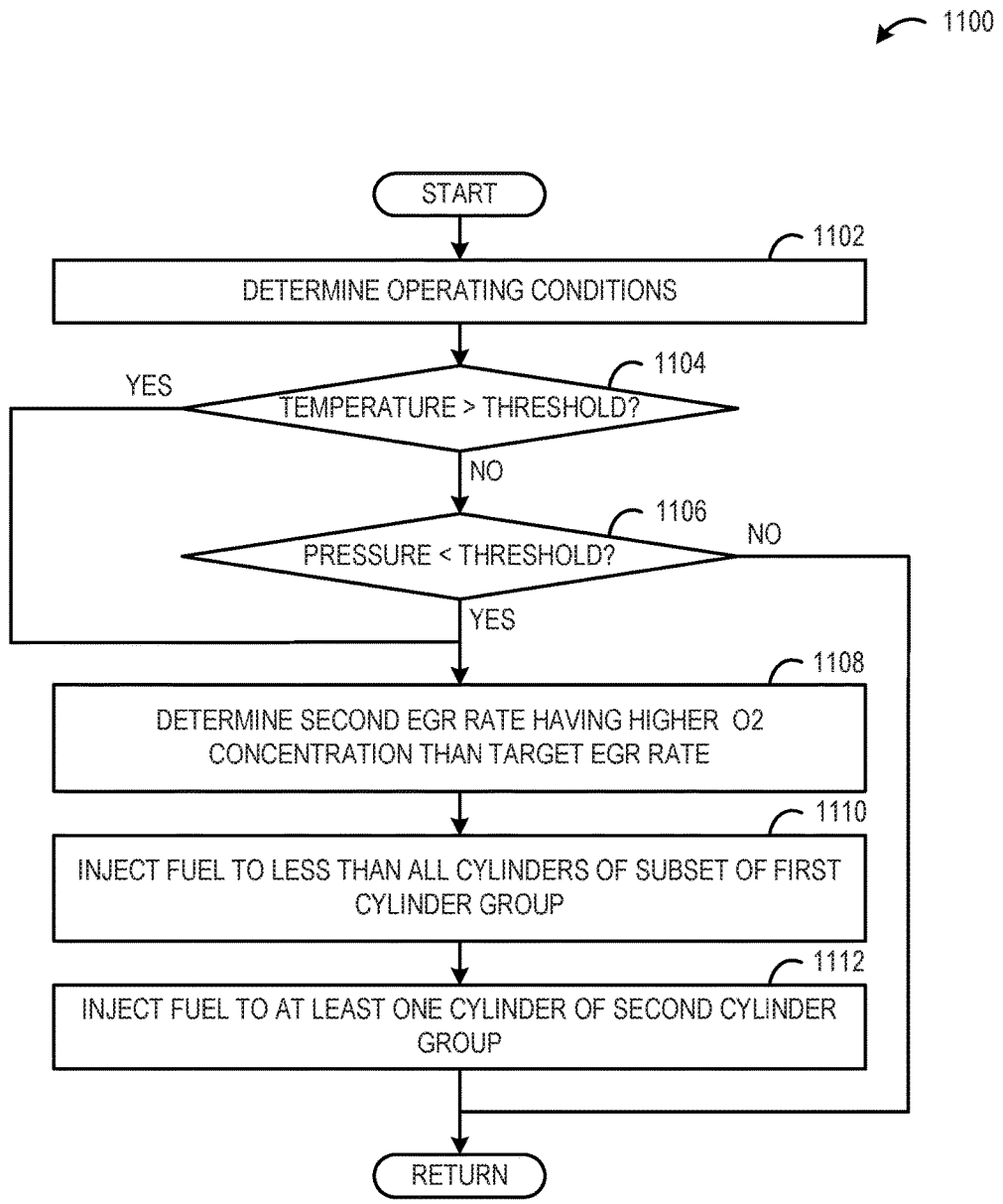
FIG. 11 shows a flow chart of another embodiment of a method for controlling EGR in an engine by skip firing based on a temperature or pressure condition.

FIG. 11 shows a flow chart of an embodiment of a method 1100 for controlling EGR in an engine during various temperature or pressure conditions. In one embodiment, the method 1100 is executed by the controller 112 in FIG. 1, the controller 654 in FIG. 6, the controller 754 in FIG. 7, or the controller 854 in FIG. 8. At 1102, the method 1100 includes determining operating conditions. The method 1100 is executed alone or in combination with the method 900 shown in FIG. 9.

At 1104, the method 1100 includes determining whether a temperature is greater than a temperature threshold value. For example, the temperature may be an ambient temperature and the temperature threshold value ranges from 25-50° C. In another example, the temperature is an engine coolant temperature and the temperature threshold value ranges from 100-120° C. If it is determined that the temperature is greater than the temperature threshold value, then the method 1100 moves to 1108. Otherwise the method 1100 moves to 1106.

At 1106, the method 1100 includes determining whether a pressure is less than a pressure threshold value. For example, the pressure may be an ambient pressure. If it is determined that the pressure is less than the pressure threshold value, then the method 1100 moves to 1108. Otherwise the method 1100 returns to other operations.

At 1108, the method 1100 includes determining a second EGR rate that has a higher oxygen concentration than the target EGR rate. For example, the target EGR rate is determined based on operation at lower temperatures or higher pressures.

At 1110, the method 1100 includes injecting fuel to less than all cylinders of the subset of cylinders of the first cylinder group to obtain the second EGR rate.

At 1112, the method 1100 includes injecting fuel to at least one cylinder of the second cylinder group. In one embodiment, the method includes injecting fuel to each cylinder of the second cylinder group.

By skip firing more cylinders that provide EGR during adverse ambient environmental conditions (e.g., high temperature or low density air), heat load on the EGR cooler is reduced. In this way, performance of the engine is increased.

An embodiment is directed to a method for controlling exhaust gas recirculation (EGR) rate in an internal combustion engine. The method includes routing at least a portion of exhaust from a first exhaust manifold to an air intake manifold coupled to the engine, and not to atmosphere, the first exhaust manifold exclusively coupled to a first cylinder group; routing exhaust from at least one additional exhaust manifold coupled to a corresponding at least one additional cylinder group to atmosphere; and during a first engine operating condition where an engine fuel demand is below a threshold demand, not injecting fuel to each of a subset of cylinders in the first cylinder group while injecting fuel to a subset of all cylinders coupled to the at least one additional exhaust manifold, where a number of cylinders of the subset of cylinders in the first cylinder group decreases in response to an increase in a target EGR rate.

In an example, the at least one additional exhaust manifold comprises a second exhaust manifold and a third exhaust manifold, each configured to discharge exhaust to the atmosphere. The first exhaust manifold may be configured to discharge exhaust into one or both of the second exhaust manifold and the third exhaust manifold. The first exhaust manifold and the second exhaust manifold may be on a single cylinder bank of the engine. In an example, the single cylinder bank is a first cylinder bank, and the first exhaust manifold is on a second cylinder bank of the engine. In examples, injecting fuel to the subset of all cylinders coupled to the at least one additional exhaust manifold comprises injecting fuel to a subset of cylinders coupled to the second exhaust manifold and injecting fuel to a subset of cylinders coupled to the third manifold. In examples, injecting fuel to the subset of all cylinders coupled to the at least one additional exhaust manifold comprises injecting fuel to a subset of cylinders coupled to the second exhaust manifold and injecting fuel to all cylinders coupled to the third manifold.

The target EGR rate may be based on one or more of engine load, engine speed, combustion stability, particulate matter concentration, intake manifold oxygen concentration, or NOx emissions. In example, the method further comprises controlling injection of fuel to the subset of cylinders of the first cylinder group to obtain a second EGR rate that has a higher oxygen concentration than the target EGR rate. In an example, the method further comprises adjusting a fuel injection amount to at least one cylinder of the subset of cylinders of the first cylinder group to obtain the target EGR rate.

Another embodiment relates to method, including setting a target exhaust gas recirculation (EGR) rate based on one or more of engine load, engine speed, combustion stability, particulate matter concentration, intake manifold oxygen concentration, or NOx emissions; responsive to a determined operating condition, injecting fuel to less than all cylinders of a subset of cylinders of a first cylinder group to obtain a second EGR rate that has a higher oxygen concentration than the target EGR rate, wherein the subset of cylinders includes less than all cylinders of the first cylinder group and the first cylinder group provides exhaust gas through an EGR passage structure fluidly coupled between the first cylinder group and an intake passage structure; and injecting fuel to at least one cylinder of a second cylinder group, wherein the second cylinder group provides substantially no exhaust gas through the EGR passage structure.

In an example, the determined operating condition comprises at least one of a tunnel condition, an ambient temperature being greater than a temperature threshold value, or an ambient air pressure being less than a pressure threshold value. In an example, a first subset of cylinders of the second cylinder group is coupled to a first exhaust manifold and a second subset of cylinders of the second cylinder group is coupled to a second exhaust manifold. In an example, all cylinders of the first cylinder group are coupled to a third exhaust manifold.

An embodiment for a system includes an air intake manifold coupled to an engine; a first exhaust manifold coupled to a first cylinder group of the engine; at least one additional exhaust manifold coupled to a corresponding at least one additional cylinder group of the engine; a controller configured to: route at least a portion of exhaust from the first exhaust manifold to the air intake manifold; route exhaust from the at least one additional exhaust manifold to atmosphere; and during a first engine operating condition where an engine fuel demand is below a threshold demand, not inject fuel to each of a subset of cylinders in the first cylinder group while injecting fuel to all cylinders coupled to the at least one additional exhaust manifold, where a number of cylinders of the subset of cylinders in the first cylinder group decreases in response to an increase in a target EGR rate.

In an example, the at least one additional exhaust manifold comprises a second exhaust manifold and a third exhaust manifold, each configured to discharge exhaust to the atmosphere. The first exhaust manifold may be configured to discharge exhaust into one or both of the second exhaust manifold and the third exhaust manifold. The first exhaust manifold and the second exhaust manifold may be on a single cylinder bank of the engine. The target EGR rate may be based on one or more of engine load, engine speed, combustion stability, particulate matter concentration, intake manifold oxygen concentration, or NOx emissions. The controller may be further configured to control injection of fuel to the subset of cylinders of the first cylinder group to obtain a second EGR rate that has a higher oxygen concentration than the target EGR rate.

As described above with respect to FIG. 1, each cylinder may have a fuel injector configured for injecting fuel thereto, and during skip fire operation—whether the skip fire is preferentially performed on the donor cylinders to reduce the effective EGR rate or whether the skip fire is preferentially performed on the non-donor cylinders to increase the effective EGR rate—one or more fuel injectors of the engine may be deactivated in order to skip firing of that cylinder. In some examples, the engine may be configured as a dual fuel engine, where the fuel supplied by the fuel injector is liquid fuel used as an ignition source to initiate combustion of a second fuel in the cylinder, such as gaseous fuel.

It should be noted herein that in accordance with the embodiments discussed herein, once the skip fire mode is activated, there may be a small delay in real time for at least one more cycle of the crank shaft until the skip fire is initiated. Such a delay in initiation of the skip fire is done to ensure there is always a pilot injection of the liquid fuel (e.g., diesel) to ignite the gaseous fuel during a transition from a normal mode to skip fire mode. For example, when there is a requirement for a transition from a normal mode to a skip fire mode (e.g., based on fuel demand) and if the gaseous fuel is injected before a command for the transition was triggered and diesel injection is skipped after the command for the transition was triggered, the gaseous fuel does not burn, resulting in wastage of fuel and generation of higher hydrocarbon emissions. In accordance with the embodiments of the present disclosure, the delay in initiation of the skip fire for at least one more cycle of the crank shaft is done to overcome the associated problems during the transition from the normal mode to the skip fire mode.

Thus, in some examples, responsive to fuel demand lower than a threshold demand, the controller may initiate a skip fire mode, where one or more donor cylinders (or non-donor cylinders) is skip fired. When a cylinder is skip fired, fuel injection (of both liquid fuel and gaseous) is stopped, at least for one cylinder cycle. When the skip fire mode is initiated, the first combustion event for the first "skipped" cylinder may include the gaseous fuel not being injected, but the diesel fuel still being injected. The subsequent cylinder to be skipped may then have both diesel fuel and gaseous fuel injection skipped to initiate the full skip fire mode.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for controlling exhaust gas recirculation (EGR) rate in an internal combustion engine, comprising:
   with a controller, routing at least a portion of exhaust from a first exhaust manifold to an air intake manifold coupled to the engine, and not to atmosphere, the first exhaust manifold exclusively coupled to a first cylinder group;
   with the controller, routing exhaust from at least one additional exhaust manifold coupled to a corresponding at least one additional cylinder group to atmosphere; and
   with the controller, during a first engine operating condition where an engine fuel demand is below a threshold demand, not injecting fuel to each of a subset of cylinders in the first cylinder group while injecting fuel to a subset of all cylinders coupled to the at least one additional exhaust manifold, where a number of cylinders of the subset of cylinders in the first cylinder group decreases in response to an increase in a target EGR rate.

2. The method of claim 1, wherein the at least one additional exhaust manifold comprises a second exhaust manifold and a third exhaust manifold, each configured to discharge exhaust to the atmosphere.

3. The method of claim 2, wherein the first exhaust manifold is configured to discharge exhaust into one or both of the second exhaust manifold and the third exhaust manifold.

4. The method of claim 2, wherein the first exhaust manifold and the second exhaust manifold are on a single cylinder bank of the engine.

5. The method of claim 4, wherein the single cylinder bank is a first cylinder bank, and wherein the first exhaust manifold is on a second cylinder bank of the engine.

6. The method of claim 2, wherein injecting fuel to the subset of all cylinders coupled to the at least one additional exhaust manifold comprises injecting fuel to a subset of cylinders coupled to the second exhaust manifold and injecting fuel to a subset of cylinders coupled to the third manifold.

7. The method of claim 2, wherein injecting fuel to the subset of all cylinders coupled to the at least one additional exhaust manifold comprises injecting fuel to a subset of cylinders coupled to the second exhaust manifold and injecting fuel to all cylinders coupled to the third manifold.

8. The method of claim 1, wherein the target EGR rate is based on one or more of engine load, engine speed, combustion stability, particulate matter concentration, intake manifold oxygen concentration, or NOx emissions.

9. The method of claim 8, further comprising controlling injection of fuel to the subset of cylinders of the first cylinder group to obtain a second EGR rate that has a higher oxygen concentration than the target EGR rate.

10. The method of claim 1, further comprising adjusting a fuel injection amount to at least one cylinder of the subset of cylinders of the first cylinder group to obtain the target EGR rate.

11. The method of claim 1, wherein the engine is a dual fuel engine.

12. A system, comprising:
   an air intake manifold coupled to an engine configured to combust fuel;
   a first exhaust manifold exclusively coupled to a first cylinder group of the engine;
   at least one additional exhaust manifold coupled to a corresponding at least one additional cylinder group of the engine;
   a controller configured to:
      route at least a portion of exhaust from the first exhaust manifold to the air intake manifold;
      route exhaust from the at least one additional exhaust manifold to atmosphere; and
      during a first engine operating condition where an engine fuel demand is below a threshold demand, not inject fuel to each of a subset of cylinders in the first cylinder group while injecting fuel to all cylinders coupled to the at least one additional exhaust manifold, where a number of cylinders of the subset of cylinders in the first cylinder group decreases in response to an increase in a target EGR rate.

13. The system of claim 12, wherein the at least one additional exhaust manifold comprises a second exhaust manifold and a third exhaust manifold, each configured to discharge exhaust to the atmosphere.

14. The system of claim 13, wherein the first exhaust manifold is configured to discharge exhaust into one or both of the second exhaust manifold and the third exhaust manifold.

15. The system of claim 13, wherein the first exhaust manifold and the second exhaust manifold are on a single cylinder bank of the engine.

16. The system of claim 12, wherein the target EGR rate is based on one or more of engine load, engine speed, combustion stability, particulate matter concentration, intake manifold oxygen concentration, or NOx emissions, and wherein the controller is further configured to control injection of fuel to the subset of cylinders of the first cylinder group to obtain a second EGR rate that has a higher oxygen concentration than the target EGR rate.

17. The system of claim 12, wherein the fuel is a first fuel, wherein the engine is a dual fuel engine configured to combust the first fuel and the second fuel, and wherein the controller is configured to, during a first event following onset of the first engine operating condition, not inject the second fuel while maintaining injection of the first fuel, and then during one or more subsequent events, not inject the first fuel or the second fuel to each of the subset of cylinders in the first cylinder group.

18. The system of claim 12, wherein the engine is a dual fuel engine.

19. A vehicle comprising:
the system of claim 12;
a generator coupled to the engine and configured to generate electrical power; and
a traction motor configured to be powered by the electrical power.

20. The vehicle of claim 19, wherein the engine is a dual fuel engine.

* * * * *